(12) United States Patent
Xin et al.

(10) Patent No.: US 11,284,393 B2
(45) Date of Patent: Mar. 22, 2022

(54) METHOD OF ALLOCATING RADIO RESOURCES AND ALLOCATING POWER OF RADIO RESOURCES, NODE, AND STORAGE MEDIUM

(71) Applicant: XI'AN ZHONGXING NEW SOFTWARE CO., LTD., Shaanxi (CN)

(72) Inventors: Yu Xin, Shenzhen (CN); Wubin Zhou, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 94 days.

(21) Appl. No.: 16/608,178

(22) PCT Filed: Apr. 23, 2018

(86) PCT No.: PCT/CN2018/084129
§ 371 (c)(1),
(2) Date: Jan. 17, 2020

(87) PCT Pub. No.: WO2018/196717
PCT Pub. Date: Nov. 1, 2018

(65) Prior Publication Data
US 2021/0105771 A1   Apr. 8, 2021

(30) Foreign Application Priority Data

Apr. 24, 2017   (CN) .......................... 201710271460.1

(51) Int. Cl.
*H04L 12/28*   (2006.01)
*H04W 72/04*   (2009.01)
(Continued)

(52) U.S. Cl.
CPC ....... *H04W 72/0453* (2013.01); *H04L 5/0007* (2013.01); *H04L 5/0064* (2013.01); *H04W 72/0473* (2013.01)

(58) Field of Classification Search
CPC ............ H04L 27/26025; H04W 72/04; H04W 72/0453
(Continued)

(56) References Cited

U.S. PATENT DOCUMENTS 11,096,077 B2 *   8/2021   Xie ................... H04L 27/26025
2015/0023439 A1   1/2015   Dimou et al.
(Continued)

FOREIGN PATENT DOCUMENTS

| CN | 102752864 A | 12/2012 |
| CN | 103458528 A | 12/2013 |

(Continued)

OTHER PUBLICATIONS

International Search Report for corresponding application PCT/CN2018/084129 filed Apr. 23, 2018; dated Jul. 23, 2018.
(Continued)

*Primary Examiner* — John Pezzlo
(74) *Attorney, Agent, or Firm* — Cantor Colburn LLP

(57) ABSTRACT

Disclosed are a radio resource configuration method, a radio resource power configuration method, a node, and a storage medium. The method includes: sub-bands are configured within a channel bandwidth, and any one of multiple sub-bands having a smallest sub-carrier interval is configured at an outmost position of a transmission bandwidth configuration.

15 Claims, 5 Drawing Sheets

S101 Configure sub-bands within a channel bandwidth, and configure any one of multiple sub-bands having a smallest sub-carrier interval at an outmost position of a TBC S103 Perform data transmission according to a configured radio resource

(51) Int. Cl.
   *H04L 5/00*   (2006.01)
   *H04J 1/16*   (2006.01)
(58) Field of Classification Search
   USPC .......................................... 370/252, 329, 430
   See application file for complete search history.

(56) References Cited

U.S. PATENT DOCUMENTS

2016/0021661 A1* 1/2016 Yerramalli ........... H04B 17/309
                                                                370/329
2018/0084429 A1* 3/2018 Guo .................. H04W 72/0406

FOREIGN PATENT DOCUMENTS

| | | |
|---|---|---|
| CN | 103458528 A | 4/2017 |
| CN | 106572538 A | 4/2017 |
| JP | 2010246107 A | 10/2010 |
| JP | 2011523310 A | 8/2011 |
| JP | 2016005218 A | 1/2016 |
| WO | 2016004634 A1 | 1/2016 |

OTHER PUBLICATIONS

Spreadtrum Communications, Inc, Further Considerations on the Waveform Configuration, 3PGG TSG RAN WGI meeting, #86bis, R1-1608916, Oct. 14, 2016, p. 2, section 4 to p. 3, section 5, figures 2 and 4.

Discussion on the multiplexing of different numerologies, Panasonic, 3GPP TSG-RAN WG1 Meeting 85, May 23-27, 2016, Nanjing, China, R1-164985.

European Search Report for corresponding application EP 18 79 0078; Report dated Oct. 28, 2020.

NR physical resource block definition, Intel Corporation, 3GPP TSG RAN WG1 Meeting #86bis, Lisbon, Portugal Oct. 10-14, 2016, R1-1609506.

European Search Report for corresponding application EP 18 79 0078; Full Version, Report dated Feb. 2, 2021.

Japanese Office Action for corresponding application No. 2019-557874 dated Jan. 3, 2021.

\* cited by examiner

METHOD OF ALLOCATING RADIO RESOURCES AND ALLOCATING POWER OF RADIO RESOURCES, NODE, AND STORAGE MEDIUM

CROSS-REFERENCES TO RELATED APPLICATIONS

This is a National Stage Application, filed under 35 U.S.C. 371, of International Patent Application No. PCT/CN2018/084129, filed on Apr. 23, 2018, which claims priority to Chinese patent application No. 201710271460.1 filed on Apr. 24, 2017, contents of both of which are incorporated herein by reference in their entireties.

TECHNICAL FIELD

The present disclosure relates to the field of communications, and in particular, to a radio resource configuration method, a radio resource power configuration method, a node, and a storage medium.

BACKGROUND

A wireless communication fifth generation, 5G, technology has become the research focus of major companies. Millimeter wave communication has become an important direction of a 5G technology research. In the study of the millimeter wave communication, a large single carrier bandwidth will be introduced, and a channel bandwidth of a single carrier will support multiple sub-carrier intervals $\Delta f$, such as 7.5 kHz, 15 kHz, 30 kHz, 60 kHz, and 120 kHz. However, the out-of-band attenuation differs for different sub-carrier intervals, resulting in different out-of-band leakage. A large out-of-band leakage, on the one hand, will lead to a large guard band and low spectrum utilization; and on the other hand, will lead to a high requirement on radio frequency (RF) devices, thereby resulting in a rise in the cost of the device.

SUMMARY

In view of this, an embodiment of the present disclosure is directed to provide a radio resource configuration method, a radio resource power configuration method, a node, and a storage medium.

In a first aspect, the present discloses provides a radio resource configuration method. The method includes: sub-bands (SBs) are configured within a channel bandwidth; and any one of multiple sub-bands having a smallest sub-carrier interval is configured at an outmost position of a transmission bandwidth configuration.

In a second aspect, the present disclosure further provides a radio resource power configuration method. The method includes: power of each and every sub-band is configured within a channel bandwidth. Each sub-carrier of a sub-band having a smaller sub-carrier interval is configured with smaller power, and each sub-carrier of a sub-band having a larger sub-carrier interval is configured with larger power.

In a third aspect, the present disclosure further provides a node. The node includes a first configuration module. The first configuration module is configured to configure sub-bands within a channel bandwidth; and configured to configure any one of multiple sub-bands having a smallest sub-carrier interval at an outmost position of a transmission bandwidth configuration.

In a fourth aspect, the present disclosure further provides a node. The node includes a second configuration module. The second configuration module is configured to configure power of each and every sub-band within a channel bandwidth. Each sub-carrier of a sub-band having a smaller sub-carrier interval is configured with smaller power, and each sub-carrier of a sub-band having a larger sub-carrier interval is configured with larger power.

In a fifth aspect, the present disclosure further provides a node. The node includes a memory and a processor. The memory is configured to store a program for tunnel authorization information processing. The processor is configured to execute the program. The program is executed to perform the radio resource configuration method described above.

In a sixth aspect, the present disclosure further provides a node. The node includes a memory and a processor. The memory is configured to store a program for tunnel authorization information processing. The processor is configured to execute the program. The program is executed to perform the radio resource power configuration method described above.

In a seventh aspect, the present disclosure further provides a storage medium. The storage medium includes a stored program. The program is executed to perform the radio resource configuration method described above.

In an eighth aspect, the present disclosure further provides a storage medium. The storage medium includes a stored program. The program is executed to perform the radio resource power configuration method described above.

With the above technical solutions, the present disclosure has at least the following beneficial effects:

When the sub-bands within the channel bandwidth (CB) of the transmitting node carrier are configured, the sub-band configured at the outmost of the transmission bandwidth configuration (TBC) has a smallest sub-carrier interval. Since the sub-band having the smaller sub-carrier interval corresponds to faster out-of-band attenuation in the frequency domain, it is possible to reduce the out-of-band leakage outside the channel band of the entire carrier, avoid configuration of larger guard band, increase the spectrum resource utilization rate significantly, reduce the requirement on the radio frequency device such as a filter, and reduce the cost.

The power of each and every sub-band within the channel bandwidth of the transmitting node carrier is configured, such that each sub-carrier in the sub-band having the smaller sub-carrier interval is configured with smaller power, and each sub-carrier in the sub-band having the larger sub-carrier interval is configured with larger power. Since a smaller sub-carrier interval means larger length of the sub-carrier in time domain and more time for accumulating power in the time domain, smaller power is allocated in the power configuration; and since a larger sub-carrier interval means less length of the sub-carrier in the time domain and less time for accumulating power in the time domain, larger power is allocated in the power configuration. As such, on one hand, the power on each resource element (RE) may be ensured to be unchanged; and on the other hand, the out-of-band leakage may be reduced

DETAILED DESCRIPTION

In order to further explain the technical means and effects of the present disclosure adopted to achieve the predetermined purpose, the present disclosure will be described in detail in conjunction with the accompanying drawings and embodiments below.

Figure 1:
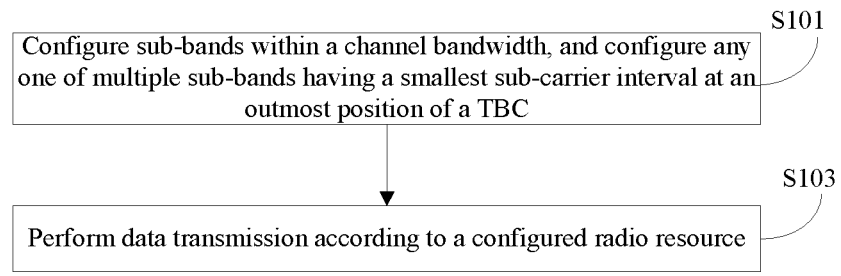
FIG. 1 is a flowchart of a radio resource configuration method according to an embodiment of the present disclosure.

An embodiment of the present disclosure provides a radio resource configuration method, which is used for configuring the radio resource. As shown in FIG. 1, the radio resource configuration method of this embodiment includes steps described below.

In step S101, sub-bands are configured within a channel bandwidth, and any one of multiple sub-bands having a smallest sub-carrier interval is configured at an outmost position of a transmission bandwidth configuration (TBC).

In step S103, data transmission is performed according to configured radio resource.

Among the sub-bands configured within the channel bandwidth, a sub-band closest to a middle position of the channel bandwidth has a largest sub-carrier interval.

In an embodiment, among all the sub-bands configured in a frequency domain range from the outmost position of the transmission bandwidth configuration to the middle position of the channel bandwidth, sub-carrier intervals within the configured different sub-bands monotonically increase. That is, the sub-carrier interval is larger in the sub-bands closer to the middle position of the channel bandwidth; the sub-carrier interval is smaller in the sub-bands closer to the outmost position of the transmission bandwidth configuration.

In an embodiment, among all the sub-bands configured in a frequency domain range from the outmost position of the transmission bandwidth configuration to the middle position of the channel bandwidth, bandwidths of different sub-bands having the same sub-carrier interval monotonically increase. That is, from the outmost position of the transmission bandwidth configuration to the middle position of the channel bandwidth, if the sub-bands having the same sub-carrier interval are configured, the order of the sub-bands is determined according to the bandwidth of the sub-bands. For the sub-bands having the same sub-carrier interval, the bandwidth of the sub-bands closer to the outmost position of the transmission bandwidth configuration is smaller; the bandwidth of the sub-bands closer to the middle position of the channel bandwidth is larger.

In the embodiment of the present disclosure, the sub-band is a section of continuous physical time-frequency resource block having the same sub-carrier interval; the channel bandwidth is a radio frequency bandwidth of a transmitting node carrier in a system; the transmission bandwidth configuration is a total bandwidth in a frequency domain of physical time-frequency resources in a frequency domain within the channel bandwidth; in addition, after a sub-band configuration is performed by adopting a radio resource configuration scheme provided in the embodiment of the present disclosure, within the channel bandwidth, two guard bands disposed outside (on both sides) of the transmission bandwidth configuration may be asymmetric; alternatively, the two guard bands may also be symmetric.

A node mentioned in the embodiment of the present disclosure may include various transmitting devices such as a base station, a terminal, a relay, and a transmission point. In fact, the identity of any network node may change in different scenarios, for example, the terminal may also function to send data. The solution of the embodiment of the present disclosure may be applied to various network nodes and is not limited to a network side device node such as a base station.

Figure 2:
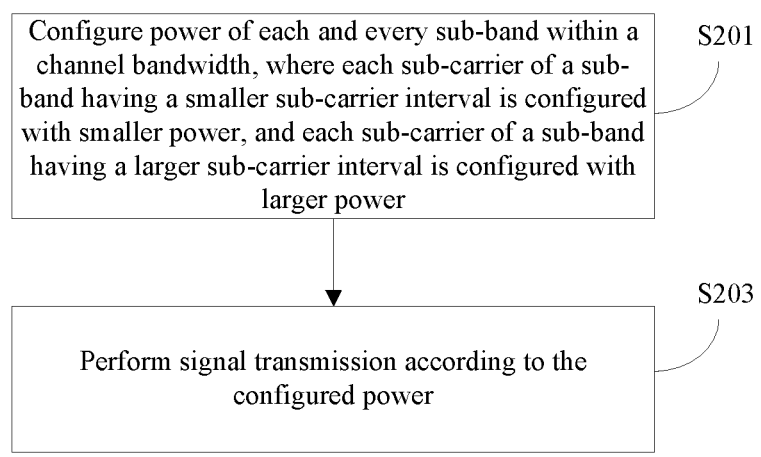
FIG. 2 is a flowchart of a radio resource power configuration method according to an embodiment of the present disclosure.

An embodiment of the present disclosure further provides a radio resource power configuration method, which may be implemented by the node (e.g., a network node such as a base station, a terminal, a relay, a transmission point), and the node configures transmission power and transmits data according to this method. As shown in FIG. 2, the method includes steps described below.

In step S201, power of each and every sub-band within a channel bandwidth is configured, where each sub-carrier of a sub-band having a smaller sub-carrier interval is configured with smaller power, and each sub-carrier of a sub-band having a larger sub-carrier interval is configured with larger power.

In step S203, signal transmission is performed according to the allocated power.

The power of each sub-band is proportional to a bandwidth of the sub-band within the channel bandwidth.

The radio resource power configuration method according to the embodiment of the present disclosure may be used in various scenarios. For example, it is possible to complete power configuration through the radio resource power configuration method described above on the basis of the sub-band configured by means of the radio resource configuration method (the method shown in FIG. 1) described previously. Alternatively, the power configuration may be directly performed on each sub-band without depending on the radio resource configuration method described previously (the method shown in FIG. 1).

An embodiment of the present disclosure also provides a node (which may be various devices capable of sending data, such as a base station, a terminal, a relay), and the node is configured to configure the radio resource.

Figure 3:
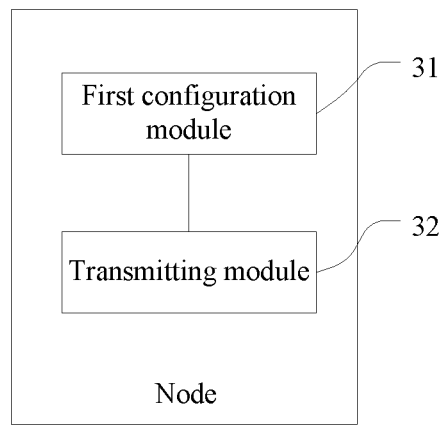
FIG. 3 is a schematic diagram of a composition structure of a node according to an embodiment of the present disclosure.

As shown in FIG. 3, the node of the embodiment of the present disclosure includes a first configuration module 31 and a transmitting module 32.

The first configuration module 31 is configured to configure sub-bands within a channel bandwidth, and configure any one of multiple sub-bands having a smallest sub-carrier interval at an outmost position of a transmission bandwidth configuration (TBC).

The transmitting module 32 is configured to transmit a signal according to a configured radio resource.

A sub-carrier interval in the configured sub-bands is the largest at a middle position closest to the channel bandwidth. Specifically, in a frequency domain range from the outmost position of the transmission bandwidth configuration to the middle position of the channel bandwidth, sub-carrier intervals within the configured different sub-bands monotonically increase; and on this basis, among all the sub-bands configured in a frequency domain range from the outmost position of the transmission bandwidth configuration to the middle position of the channel bandwidth, bandwidth of these sub-bands monotonically increase for different sub-bands having the same sub-carrier interval.

In an embodiment, the above-mentioned node is further configured to configure power of the sub-bands within the channel bandwidth, such that each sub-carrier in a sub-band having a smaller sub-carrier interval is configured with smaller power, and each sub-carrier in a sub-band having a larger sub-carrier interval is configured with larger power.

In an embodiment, the node is further configured to configure power of the sub-bands within the channel bandwidth, such that the power of each sub-band is proportional to a bandwidth of the sub-band.

The embodiment of the present disclosure further provides a node, the node includes a second configuration module, the second configuration module is configured to configure power of each and every sub-band within the channel bandwidth, such that each sub-carrier in a sub-band having a smaller sub-carrier interval is configured with smaller power, and each sub-carrier in a sub-band with a larger sub-carrier interval is configured with larger power.

In an embodiment, the second configuration module is further configured to configure power of each and every sub-band within the channel bandwidth, such that the power of each sub-band is proportional to a bandwidth of the sub-band.

Various embodiments will be described in detail below in conjunction with the accompanying drawings. These embodiments are provided to explain the technical solution of the present disclosure, and the technical solution of the present disclosure is not limited thereto.

First Embodiment

The radio resource configuration method and the radio resource power configuration method provided in the embodiments may be applied to a network node such as a transmitting node. A transmitting node (also referred to as a transmitting end) of a multi-carrier system includes various transmitting device such as a base station, a terminal, a relay, and a transmission point.

In a wireless communication system, a channel bandwidth is a radio frequency bandwidth supported by a single carrier of a transmitting node in the communication system, and is usually composed of a TBC and a Guard Band (GB). The GB includes two portions disposed at both sides of the transmission bandwidth configuration respectively. The TBC is the maximum transmission bandwidth supported by the transmitting node within the channel bandwidth of the system, and includes a total bandwidth of physical time-frequency resources in a frequency domain within the channel bandwidth.

In the embodiment of the present disclosure, a sub-band is a section of continuous physical time-frequency resource blocks containing the same sub-carrier interval, and the sub-band BW is expressed by a formula as follows: $BW=m*12*\Delta f$, where $\Delta f$ is a sub-carrier interval in the sub-band, m is a positive integer greater than 0, and m may be flexibly configured according to the actual service requirement.

Figure 4:
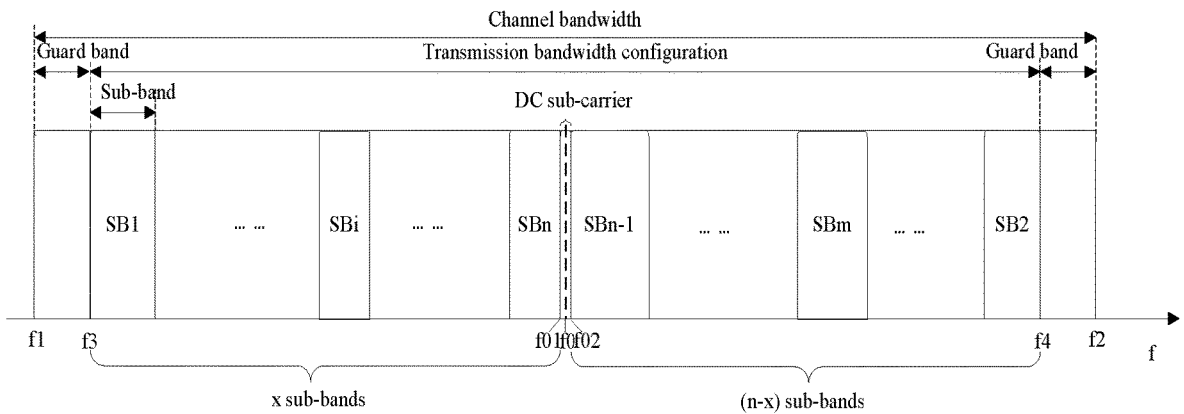
FIG. 4 is a schematic diagram I of a sub-band configuration within a channel bandwidth according to an embodiment of the present disclosure.

FIG. 4 is a schematic diagram of sub-band configuration within the channel bandwidth according to a first embodiment of the present disclosure. As shown in FIG. 4, the relationship between the frequencies is: $f_2>f_4>f_0>f_3>f_1$, $CB=f_2-f_1$, a center frequency of the channel bandwidth is expressed by a formula as follows: $f_0=(f_2+f_1)/2$, two frequency points at the outmost of the TBC are $f_3$ and $f_4$, the $TBC=f_4-f_3$, and the protection bandwidths are $f_3-f_1$ and $f_2-f_4$, respectively. Corresponding frequency domain bandwidths are respectively $f_0-f_3$ and $f_4-f_0$ in a frequency domain range from the outmost of both sides of the TBC to the center frequency $f_0$ of the CB.

With continued reference to FIG. 4, in the present embodiment, the CB of the single carrier of the transmitting node contains a DC sub-carrier, and the DC sub-carrier does not send any data, the frequency domain occupied by the DC sub-carrier is [$f_{o1}$, $f_{o2}$], and a center frequency of the DC sub-carrier is aligned with the center frequency of the channel bandwidth.

In this embodiment, it is assumed that n sub-bands are included in the TBC and the sub-carrier interval in each sub-band is not equal.

(1) If n=2, when the radio resource is allocated in the CB, the following steps are performed:

(1.1) two sub-bands are configured in frequency domain ranges from frequency point $f_3$ to frequency point $f_{o1}$ and from frequency point $f_4$ to frequency point $f_{o2}$, respectively;

(1.2) power of all sub-band are configured, such that each sub-carrier of a sub-band having a smaller sub-carrier interval is configured with smaller power, or each sub-carrier of a sub-band having larger sub-carrier interval is configured with larger power; in addition, the configured power of each sub-band is in direct proportion to a bandwidth of the sub-band.

(2) If n=3 or 4, when the radio resource is allocated in the CB, the following steps are performed:

(2.1) when the bandwidth (BW) of each sub-band is less than $f_{o1}-f_3$ and less than $f_4-f_{o2}$;

(2.2) two sub-bands at the outmost of the TBC are configured: a sub-band having the smallest sub-carrier interval is configured on one side of the outmost of the TBC, and a sub-band having the second smallest sub-carrier interval is configured on another side of the outmost of the TBC;

(2.3) sub-bands at the rest positions of the TBC are configured: the remaining sub-bands are configured in a frequency range of the remaining TBC;

(2.4) power of all sub-bands are configured, such that each sub-carrier of a sub-band having a smaller sub-carrier interval is configured with smaller power, or each sub-carrier of a sub-band having larger sub-carrier interval is configured with larger power; in addition, the configured power of each sub-band is in direct proportion to a bandwidth of the sub-band.

(3) When the BW of one of all the sub-bands is equal to $f_{o1}-f_3$ or equal to $f_4-f_{o2}$:

(3.1) a sub-band with BW equal to $f_{01}-f_3$ is configured in the frequency domain range from the frequency point $f_3$ to the frequency point $f_{01}$, or a sub-band with BW equal to $f_4-f_{02}$ is configured in the frequency domain range from the frequency point $f_4$ to the frequency point $f_{02}$;

(3.2) sub-bands on the other side of the outmost of the TBC are configured: a sub-band having the smallest sub-carrier interval in the remaining sub-bands is configured on the other side of the outmost of the TBC;

(3.3) sub-bands at the rest positions of the TBC are configured: the remaining sub-bands are configured in the remaining frequency range of the TBC in an order in which the sub-carrier interval monotonically increases, such that the sub-carrier intervals of all the different sub-bands monotonically increase in the remaining frequency ranges from the frequency point $f_3$ to the frequency point $f_{01}$ or from the frequency point $f_4$ to the frequency point $f_{02}$;

(3.4) power of all sub-bands are configured, such that each sub-carrier of a sub-band having a smaller sub-carrier interval is configured with smaller power, or each sub-carrier of a sub-band with larger sub-carrier interval is configured with larger power; in addition, the configured power of each sub-band is in direct proportion to a bandwidth of the sub-band.

(4) If n>4, when the radio resource is configured in the CB, the following steps are performed:

(4.1) when the BW of each sub-band is less than $f_{01}-f_3$ and less than $f_4-f_{02}$:

(4.1.1) two sub-bands at the outmost of the TBC are configured: a sub-band having the smallest sub-carrier interval is configured on one side of the outmost of the TBC, and a sub-band having the second smallest sub-carrier interval is configured on the other side of the outmost of the TBC;

(4.1.2) two sub-bands closest to the middle of the CB are configured: a sub-band having the largest sub-carrier interval is configured on one side closest to the DC sub-carrier, and a sub-band having the second largest sub-carrier interval is configured on the other side closest to the DC sub-carrier;

(4.1.3) sub-bands at the rest positions of the TBC are configured: the remaining sub-bands are respectively and sequentially configured in the remaining frequency domain bandwidth of $f_{01}-f_3$ and $f_4-f_{02}$ in an order in which the sub-carrier interval monotonically increases until being filled, such that the sub-carrier intervals of all the different sub-bands monotonically increase in the remaining frequency ranges from the frequency point $f_3$ to the frequency point $f_{01}$ or from the frequency point $f_4$ to the frequency point $f_{02}$;

(4.1.4) after the above steps are completed, power of all sub-bands are configured, such that each sub-carrier of a sub-band having a smaller sub-carrier interval is configured with smaller power, or each sub-carrier of a sub-band with larger sub-carrier interval is configured with larger power; in addition, the configured power of each sub-band is in direct proportion to a bandwidth of the sub-band;

(4.2) when the BW of one of all the sub-bands is equal to $f_{01}-f_3$ or equal to $f_4-f_{02}$:

(4.2.1) the sub-band with BW equal to $f_{01}-f_3$ is configured in the frequency domain range from the frequency point $f_3$ to the frequency point $f_{01}$, or the sub-band with BW equal to $f_4-f_{02}$ is configured in the frequency domain range from the frequency point $f_4$ to the frequency point $f_{02}$;

(4.2.2) sub-bands on the other side of the outmost of the TBC are configured: a sub-band having the smallest sub-carrier interval in the remaining sub-bands is configured on the other side of the outmost of the TBC;

(4.2.3) sub-bands at the rest positions of the TBC are configured: the remaining sub-bands are configured in the remaining frequency range of the TBC in an order in which the sub-carrier interval monotonically increases, such that the sub-carrier intervals of all the different sub-bands monotonically increase in the remaining frequency ranges from frequency point $f_3$ to frequency point $f_{01}$ or from frequency point $f_4$ to frequency point $f_{02}$;

(4.2.4) power of all sub-bands are configured, such that each sub-carrier of a sub-band having a smaller sub-carrier interval is configured with smaller power, or each sub-carrier of a sub-band having larger sub-carrier interval is configured with larger power; in addition, the configured power of each sub-band is in direct proportion to a bandwidth of the sub-band.

In the above configuration steps, all the sub-bands may be continuous or discontinuous (i.e. there is a certain guard interval between adjacent sub-bands). After the configuration of all the sub-bands is completed by means of the above steps, if $f_3-f_1=f_2-f_4$, the guard bands on both sides of the TBC are symmetrical; otherwise, the guard bands are asymmetrical.

When the sub-band at the outmost of the TBC is configured, no specific requirement is made on the corresponding relationship between the configured two sub-bands and the outmost of the TBC. For example, the sub-band having the smallest sub-carrier interval is sub-band $SB_1$, and the sub-band having the second smallest sub-carrier interval is sub-band $SB_2$, and then the sub-band $SB_1$ is configured immediately adjacent to the frequency point $f_3$, and the $SB_2$ is configured immediately adjacent to the frequency point $f_4$; or the $SB_1$ is configured immediately adjacent to the frequency point $f_4$, and the $SB_2$ is configured immediately adjacent to the frequency point $f_3$.

When the sub-band closest to the middle of the CB is configured, no specific requirement is made on the corresponding relationship between the configured two sub-bands and the positions of the two sides closest to the middle of the CB. For example, the sub-band having the largest sub-carrier interval is sub-band $SB_n$, the sub-band having the second largest sub-carrier interval is sub-band $SB_{n-1}$, and then the $SB_n$ is configured on the left side closest to the DC sub-carrier, and the $SB_{n-1}$ is configured on the right side closest to the DC sub-carrier; or the $SB_{n-1}$ is configured on the left side closest to the DC sub-carrier, and the $SB_n$ is configured on the right side closest to the DC sub-carrier.

The sub-bands at the rest positions of the TBC are configured. For the remaining sub-bands, no specific requirement is made on the sub-bands configured in the remaining frequency domain bandwidth of $f_{01}-f_3$ or $f_4-f_{02}$. That is, any one of these remaining sub-bands may be placed within the remaining frequency domain bandwidth of $f_{01}-f_3$ or $f_4-f_{02}$.

In an example, it is assumed that time-frequency resources of n (n>4) sub-bands are included in the TBC. As shown in FIG. 4, each of the sub-bands has a sub-carrier interval which is not equal to any of other sub-bands. The sub-carrier intervals are $\Delta f_1, \Delta f_2, \ldots, \Delta f_i, \Delta f_{i+1}, \ldots \Delta f_{n-1}, \Delta f_n$, respectively, and have a following relationship: $\Delta f_1 < \Delta f_2 < \ldots \Delta f_i < \Delta f_{i+1} < \ldots < \Delta f_{n-1} < \Delta f_n$. All the n sub-bands are numbered according to the corresponding relation of the sub-carrier intervals, i.e., the sub-carrier intervals corresponding to the $SB_i$ is $\Delta f_i$, i=1, 2, ... n-1, n.

The bandwidths of respective sub-band are: $BW_1$, $BW_2, \ldots, BW_i, BW_{i+1}, \ldots BW_{n-1}, BW_n, BW_i$ (i=1, 2, ... n-1, n), and these bandwidths are less than $f_0-f_3$ and $f_4-f_0$. The power configured for each sub-band is $P_1$, $P_2, \ldots, P_i, P_{i+1}, \ldots P_{n-1}$, and $P_n$ respectively. The power configured for each sub-carrier in each sub-band is $p_1$, $p_2, \ldots, p_i, p_{i+1}, \ldots p_{n-1}$, and $p_n$ respectively. Since the sub-carrier interval is equal in each sub-band, the power of each sub-carrier in each sub-band is also equal.

Then the steps of the method in this embodiment are performed to:

1. configure the two sub-bands at the outmost of the TBC: the sub-band $SB_1$ is configured immediately adjacent to the frequency point $f_3$, and the sub-band $SB_2$ is configured immediately adjacent to the frequency point $f_4$;

2. configure the two sub-bands closest to the middle of the CB: the $SB_n$ is configured on the left side closest to the DC sub-carrier, and the $SB_{n-1}$ is configured on the right side closest to the DC sub-carrier;

3. configure the sub-bands at the rest positions of the TBC: and (x−2) SBs are finally configured in the remaining frequency range from the frequency point $f_3$ to the frequency point $f_{01}$ in an order in which the sub-carrier interval monotonically increases, and (n−x−2) SBs are finally configured in the remaining frequency range from the frequency point $f_4$ to the frequency point $f_{02}$ in an order in which the sub-carrier interval monotonically increases.

All the sub-bands are configured by means of the three steps described above, as shown in FIG. 4. In the frequency range from the frequency point $f_3$ to the frequency point $f_{01}$ and the frequency range from the frequency point $f_4$ to the frequency point $f_{02}$, the sub-carrier intervals of different sub-bands in all the configured sub-bands monotonically increase. That is, the sub-bands in the frequency range from the frequency point $f_3$ to the frequency point $f_{01}$ satisfy: $\Delta f_1 < \ldots < \Delta f_i < \ldots < \Delta f_n$, and the sub-bands in the frequency range from the frequency point $f_4$ to the frequency point $f_{02}$ satisfy: $\Delta f_2 < \ldots < \Delta f_m < \ldots < \Delta f_{n-1}$.

In addition, in the frequency range from the frequency point $f_3$ to the frequency point $f_{01}$ and the frequency range from the frequency point $f_4$ to the frequency point $f_{02}$, all the configured sub-bands may be placed continuously or discontinuously (that is, there is a certain guard interval between adjacent sub-bands). After all the sub-bands are configured, if $f_3-f_1=f_2-f_4$, the guard bands on both sides of the TBC are symmetrical; otherwise, the guard bands are asymmetrical.

After all the sub-bands are configured, the power of the sub-carriers and the power of the sub-bands are configured. That is, the power in the frequency range from the frequency point $f_3$ to the frequency point $f_{01}$ satisfies: $p_1 < \ldots < p_i < \ldots < p_n$, and the power in the frequency range from the frequency point $f_4$ to the frequency point $f_{02}$ satisfies: $p_2 < \ldots < p_m < \ldots < p_{n-1}$ and $p_1 < p_2 < \ldots < p_i < p_{i+1} < \ldots < p_{n-1} < p_n$. The power $P_n$ configured for each sub-band is proportional to $BW_n$ of the sub-band.

Second Embodiment

Figure 5:
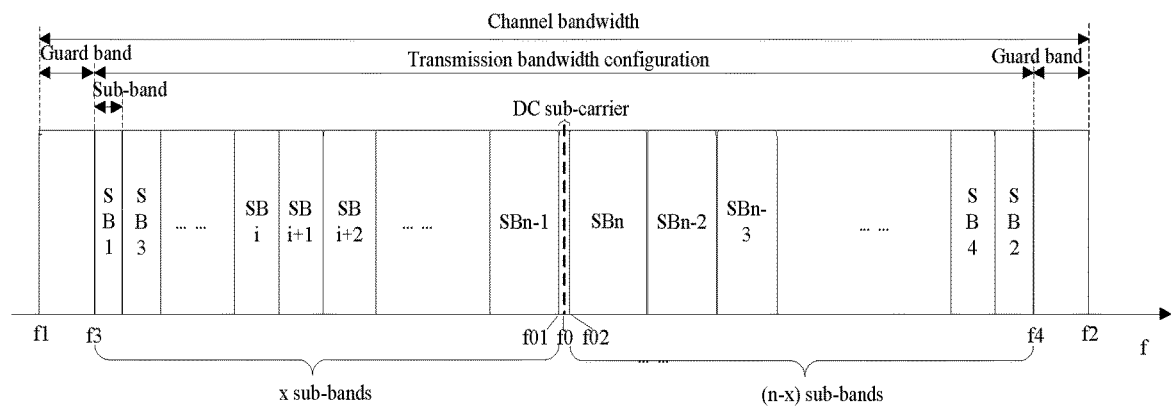
FIG. 5 is a schematic diagram II of a sub-band configuration within a channel bandwidth according to an embodiment of the present disclosure.

In the present embodiment, as shown in FIG. 5, the CB of the single carrier of the transmitting node contains a DC sub-carrier, and no data is sent on the DC sub-carrier. The DC sub-carrier occupies [$f_{01}, f_{02}$] in frequency domain, and the center frequency of the DC sub-carrier is aligned with the center frequency of the channel bandwidth.

With continued reference to FIG. 5, it is assumed that n sub-bands are included in the TBC, and the sub-carrier intervals in at least two of all the sub-bands are the same, and the sub-carrier intervals of different sub-bands are not all equal.

(1) If n=2, when the radio resource is configured in the CB, the following steps are performed:

(1.1) these two sub-bands are configured in frequency domain ranges from a frequency point $f_3$ to a frequency point $f_{01}$ and from a frequency point $f_4$ to a frequency point $f_{02}$, respectively;

(1.2) power of all sub-bands is allocated, such that the power configured for respective sub-carrier in each sub-band is equal; in addition, the configured power of each sub-band is in direct proportion to a bandwidth of the sub-band.

(2) If n=3 or 4, when the radio resource is configured in the CB, the following steps are performed:

(2.1) when the BW of each sub-band is less than $f_{01}-f_3$ and less than $f_4-f_{02}$:

a) two sub-bands at the outmost of the TBC are configured:

i. in a case where sub-bands having the same sub-carrier interval have the smallest sub-carrier interval:

if some of these sub-bands have the same and smallest bandwidth, then any two of these sub-bands with the same bandwidth are configured on both sides of the outmost of the TBC;

if some of these sub-bands have the same bandwidth but not the smallest bandwidth, then one of the sub-bands with the smallest bandwidth is configured on one side of the outmost of the TBC, and any one of the sub-bands with the same bandwidth is configured on the other side of the outmost of the TBC;

if none of the bandwidths of these sub-carriers are equal, then one of the sub-bands with the smallest bandwidth is configured on one side of the outmost of the TBC, and one of the sub-bands with the second smallest bandwidth is configured on the other side of the outmost of the TBC;

if the bandwidths of all these sub-bands are equal, then any two of these sub-bands with equal bandwidth are configured on both sides of the outmost of the TBC;

ii. if the sub-bands having the same sub-carrier interval do not have the smallest sub-carrier interval, then a sub-band having the smallest sub-carrier interval is configured on one side of the outmost of the TBC, and a sub-band having the second smallest sub-carrier interval is configured on the other side of the outmost of the TBC;

b) sub-bands at the rest positions of the TBC are configured: the remaining sub-bands are configured in a frequency range of the remaining TBC;

c) power of all sub-bands are configured, such that each sub-carrier of a sub-band having a smaller sub-carrier interval is configured with smaller power, or each sub-carrier of a sub-band having a larger sub-carrier interval is configured with larger power, in addition, the configured power of each sub-band is in direct proportion to a bandwidth of the sub-band.

(2.2) when the BW of one of all the sub-bands is equal to $f_{01}-f_3$ or equal to $f_4-f_{02}$:

a) the sub-bands with BW equal to $f_{01}-f_3$ is configured in the frequency domain range from the frequency point $f_3$ to the frequency point $f_{01}$, or the sub-band with BW equal to $f_4-f_{02}$ is configured in the frequency domain range from the frequency point $f_4$ to the frequency point $f_{02}$;

b) sub-bands on the other side of the outmost of the TBC are configured:

i. in a case where sub-bands having the same sub-carrier interval have the smallest sub-carrier interval:

if some of these sub-bands have the same and smallest bandwidth, then any one of these sub-bands with the same bandwidth is configured on the other side of the outmost of the TBC;

if some of these sub-bands have the same bandwidth but not the smallest bandwidth, then one of the sub-bands with the smallest bandwidth is configured on the other side of the outmost of the TBC;

if none of the bandwidths of these sub-carriers are equal, then one of the sub-bands with the smallest bandwidth is configured on the other side of the outmost of the TBC;

if the bandwidths of all these sub-bands are equal, then any one of these sub-bands with the same bandwidth is configured on the other side of the outmost of the TBC;

ii. if sub-bands having the same sub-carrier interval do not have the smallest sub-carrier interval, then one of the sub-bands having the smallest sub-carrier interval is configured on the other side of the outmost of the TBC;

c) sub-bands at the rest positions of the TBC are configured: the remaining sub-bands are configured in the remaining frequency range of the TBC in an order in which the sub-carrier interval monotonically increases and in an order in which the bandwidth monotonically increases for different sub-bands having the same sub-carrier interval, such that the sub-carrier intervals of all different sub-bands monotonically increase and the bandwidths of different sub-bands having the same sub-carrier interval monotonically increase in the remaining frequency range from frequency point $f_3$ to frequency point $f_{O1}$ or from frequency point $f_4$ to frequency point $f_{O2}$;

d) power of all sub-bands is configured, such that each sub-carrier of a sub-band having a smaller sub-carrier interval is configured with smaller power, or each sub-carrier of a sub-band having larger sub-carrier interval is configured with larger power; in addition, the configured power of each sub-band is in direct proportion to a bandwidth of the sub-band.

(3) If n>4, when the radio resource is configured in the CB, the following steps are performed:

(3.1) when the BW of each sub-band is less than $f_{O1}-f_3$ and less than $f_4-f_{O2}$:

a) two sub-bands at the outmost of the TBC are configured:

i. in a case where sub-bands having the same sub-carrier interval have the smallest sub-carrier interval:

if some of these sub-bands have the same and smallest bandwidth, then any two of these sub-bands with the same bandwidth are configured on both sides of the outmost of the TBC;

if some of these sub-bands have the same bandwidth but not the smallest bandwidth, then one of the sub-bands with the smallest bandwidth is configured on one side of the outmost of the TBC, and one of the sub-bands with the second smallest bandwidth is configured on the other side of the outmost of the TBC;

if none of the bandwidths of these sub-carriers are equal, then one of the sub-bands with the smallest bandwidth is configured on one side of the outmost of the TBC, and one of the sub-bands with the second smallest bandwidth is configured on the other side of the outmost of the TBC;

if the bandwidths of all of these sub-bands are equal, then any two sub-bands with the same bandwidth are configured on both sides of the outmost of the TBC;

ii. if sub-bands having the same sub-carrier interval do not have the smallest sub-carrier interval, then a sub-band having the smallest sub-carrier interval is configured on one side of the outmost of the TBC, and a sub-band having the second smallest sub-carrier interval is configured on the other side of the outmost of the TBC;

b) two sub-bands closest to the middle of the CB are configured:

i. in a case where sub-bands having the same sub-carrier interval have the largest sub-carrier interval:

if some of these sub-bands have the same and largest bandwidth, then any two of these sub-bands with the same bandwidth are configured on two sides closest to the DC sub-carrier;

if some of these sub-bands have the same bandwidth but not the larges bandwidth, then one of the sub-bands with the largest bandwidth is configured on one side of two sides closest to the DC sub-carrier, and one of the sub-bands with the second largest bandwidth is configured on the other side of the two sides of the DC sub-carrier;

if none of the bandwidths of these sub-carriers are equal, then one of the sub-bands with the largest bandwidth is configured on one side of two sides closest to the DC sub-carrier, and one of the sub-bands with the second largest bandwidth is configured on the other side of the two sides of the DC sub-carrier;

if the bandwidths of all these sub-bands are equal, then any two sub-bands with the same bandwidth are configured on two sides of the DC sub-carrier;

ii. if sub-bands with the same sub-carrier interval do not have the largest sub-carrier interval, then a sub-band having the largest sub-carrier interval is configured on one side of two sides of the DC sub-carrier, and a sub-band having the second smallest sub-carrier interval is configured on the other side of the two sides of the DC sub-carrier;

c) sub-bands at the rest positions of the TBC are configured: the remaining sub-bands are respectively and sequentially configured in the remaining frequency domain bandwidth of $f_{O1}-f_3$ and $f_4-f_{O2}$ in an order in which the sub-carrier interval monotonically increases and in an order in which the bandwidth monotonically increases for different sub-bands having the same sub-carrier interval until being filled, such that the sub-carrier intervals of all the different sub-bands monotonically increase and the bandwidths of different sub-bands having the same sub-carrier interval monotonically increase in the remaining frequency ranges from the frequency point $f_3$ to the frequency point $f_{O1}$ or from the frequency point $f_4$ to the frequency point $f_{O2}$;

d) after the above steps are completed, power of all sub-bands are configured, such that the power configured for the sub-carriers in different sub-bands having the same sub-carrier interval is equal; meanwhile, and each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band;

(3.2) when the BW of one of all the sub-bands is equal to $f_{O1}-f_3$ or equal to $f_4-f_{O2}$:

a) the sub-band with BW equal to $f_{O1}-f_3$ is configured in the frequency domain range from the frequency point $f_3$ to the frequency point $f_{O1}$, or the sub-band with BW equal to $f_4-f_{O2}$ is configured in the frequency domain range from the frequency point $f_4$ to the frequency point $f_{O2}$;

b) sub-bands on the other side of the outmost of the TBC are configured:

i. in a case where sub-bands having the same sub-carrier interval is configured with the smallest sub-carrier interval:

if some of these sub-bands have the same and smallest bandwidth, then any one of these sub-bands with the same bandwidth is configured on the other side of the outmost of the TBC;

if some of these sub-bands have the same bandwidth but not the smallest bandwidth, then one of the sub-bands with the smallest bandwidth is configured on the other side of the outmost of the TBC;

if none of the bandwidths of these sub-carriers are equal, then one of the sub-bands with the smallest bandwidth is configured on the other side of the outmost of the TBC;

if the bandwidths of all these sub-bands are equal, then any one of these sub-bands with the same bandwidth is configured on the other side of the outmost of the TBC;

ii. if sub-bands having the same sub-carrier interval do not have the smallest sub-carrier interval, then one of the sub-bands having the smallest sub-carrier interval is configured on the other side of the outmost of the TBC;

c) sub-bands at the rest positions of the TBC are configured: the remaining sub-bands are configured in the remaining frequency range of the TBC in an order in which the sub-carrier interval monotonically increases and in an order in which the bandwidth monotonically increases for different sub-bands having the same sub-carrier interval, such that the sub-carrier intervals of all different sub-bands monotonically increase and the bandwidths of different sub-bands having the same sub-carrier interval monotonically increase in the remaining frequency range from frequency point $f_3$ to frequency point $f_{01}$ or from frequency point $f_4$ to frequency point $f_{02}$;

d) power of all sub-bands is configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band.

In the above configuration steps, all the sub-bands may be continuous or discontinuous (i.e. there is a certain guard interval between adjacent sub-bands). After the configuration of all the sub-bands is completed by means of the above steps, if $f_3-f_1=f_2-f_4$, the guard bands on both sides of the TBC are symmetrical; otherwise, the guard bands are asymmetrical.

When the sub-band at the outmost of the TBC is configured, no specific requirement is made on the corresponding relationship between the configured two sub-bands and the outmost of the TB C.

It is assumed that there are 4 SBs ($SB_1 \sim SB_4$) having the same and smallest sub-carrier interval, i.e., $\Delta f_1 = f_2 = f_3 = \Delta f_4 \ldots < \Delta f_n$. Examples are as follows:

1) if some of these sub-bands have the same and smallest bandwidth, e.g., $BW_1=BW_2=BW_3<BW_4$, then any two of three sub-bands $SB_1$, $SB_2$, and $SB_3$ are configured immediately adjacent to the frequency point $f_3$ and the frequency point $f_4$;

2) if none of the bandwidths of these sub-carriers are equal, e.g., $BW_1<BW_2<BW_3<BW_4$, then the sub-band $SB_1$ is configured immediately adjacent to the frequency point $f_3$ and the sub-band $SB_2$ is configured immediately adjacent to the frequency point $f_4$; alternatively, the sub-band $SB_1$ is configured immediately adjacent to the frequency point $f_4$ and the sub-band $SB_2$ is configured immediately adjacent to the frequency point $f_3$;

3) if some of these sub-bands have the same bandwidth but not the smallest bandwidth, e.g., $BW_1<BW_2=BW_3<BW_4$, then the sub-band $SB_1$ is configured immediately adjacent to the frequency point $f_3$, and the sub-band $SB_2$ or the sub-band $SB_3$ is configured immediately adjacent to the frequency point $f_4$; alternatively, the sub-band $SB_1$ is configured immediately adjacent to the frequency point $f_4$, and the sub-band $SB_2$ or the sub-band $SB_3$ is configured immediately adjacent to the frequency point $f_3$;

4) if the bandwidths of all these sub-bands are equal, e.g., $BW_1=BW_2=BW_3=BW_4$, then any two of the four sub-bands are configured immediately adjacent to the frequency point $f_4$ and the frequency point $f_3$.

It is assumed that sub-bands having the same sub-carrier interval do not have the smallest sub-carrier interval, the sub-band having the smallest sub-carrier interval is configured on one side of the outmost of the TBC, and the sub-band having the second smallest sub-carrier interval is configured on the other side of the outmost of the TBC. That is, the sub-carrier intervals of the two sub-bands configured at the outermost of the TBC are different.

When the sub-band in the middle of the CB is configured, no specific requirement is made on the corresponding relationship between the configured two sub-bands and the middle position of the CB.

It is assumed that there are 4 SBs ($SB_1 \sim SB_4$) having the same and the largest sub-carrier interval, i.e., $\Delta f_1 \ldots < \Delta f_{n-3} = \Delta f_{n-2} = \Delta f_{n-1} = \Delta f_n$. Examples are as follows:

1) if some of these sub-bands have the same and largest bandwidth, e.g., $BW_{n-3}<BW_{n-2}=BW_{n-1}=BW_n$, then any two of the three sub-bands $SB_n$, $SB_{n-1}$ and $SB_{n-2}$ are configured on two sides closest to the DC sub-carrier;

2) if the bandwidths of these sub-bands are not equal, e.g., $BW_{n-3}<BW_{n-2}<BW_{n-1}<BW_n$, then the sub-band $BW_n$ is configured on one of the two sides of the DC sub-carrier, the sub-band $BW_n$ is configured on the other side of the two sides closest to the DC sub-carrier;

3) if some of these sub-bands have the same bandwidth but not the largest bandwidth, e.g., $BW_{n-3}<BW_{n-2}=BW_{n-1}<BW_n$, then the sub-band $BW_n$ is configured on the left side closest to the DC sub-carrier, the sub-band $BW_{n-1}$ or $BW_{n-2}$ is configured on the right side closest to the DC sub-carrier; alternatively, the sub-band $BW_{n-1}$ or $BW_{n-2}$ is configured on the left side closest to the DC sub-carrier, the sub-band $BW_n$ is configured on the right side closest to the DC sub-carrier;

4) if the bandwidths of all these sub-bands are equal, e.g., $BW_{n-3}=BW_{n-2}=BW_{n-1}=BW_n$, then any two of the four sub-bands are configured on two sides closest to the DC sub-carrier.

It is assumed that sub-bands having the same sub-carrier interval do not have the largest sub-carrier interval, a sub-band having a largest sub-carrier interval is configured on one side closest to the DC sub-carrier, and a sub-band having the second largest sub-carrier interval is configured on the other side closest to the DC sub-carrier. That is, the sub-carrier intervals of the two sub-bands configured on two sides closest to the DC sub-carrier are different.

The sub-bands at the rest positions of the TBC are configured, and for the remaining sub-bands, no specific requirement is made on the sub-bands configured in the remaining frequency domain bandwidth of $f_{01}-f_3$ or $f_4-f_{02}$ either. That is, any one of these remaining sub-bands may be placed within the remaining frequency domain bandwidth of $f_{01}-f_3$ or $f_4-f_{02}$.

In an example, it is assumed that n (n>4) sub-bands, SBs, are included in the TBC, the sub-carrier intervals are $\Delta f_1$, $\Delta f_2$, $\Delta f_3$, $\Delta f_4$, ..., $\Delta f_i$, $\Delta f_{i+1}$, $\Delta f_{i+2}$, $\Delta f_{i+3}$, ... $\Delta f_{n-3}$, $\Delta f_{n-2}$, $\Delta f_{n-1}$, $\Delta f_n$ respectively. The relationship of these sub-carrier intervals is:

$$\Delta f_1 = \Delta f_2 = \Delta f_3 = \Delta f_4 < \ldots < \Delta f_i = \Delta f_{i+1} = \Delta f_{i+2} = \Delta f_{i+3} < \ldots < \Delta f_{n-3} = \Delta f_{n-2} = \Delta f_{n-1} = \Delta f_n.$$

All the n sub-bands are numbered according to the corresponding relation of the sub-carrier intervals, i.e., the sub-carrier interval corresponding to the $SB_i$ is $\Delta f_i$, where i=1, 2, ... n−1, n.

The bandwidths of the sub-bands are $BW_1$, $BW_2$, $BW_3$, $BW_4$, ..., $BW_i$, $BW_{i+1}$, $BW_{i+2}$, $BW_{i+3}$, ... $BW_{n-3}$, $BW_{n-2}$, $BW_{n-1}$, and $BW_n$ respectively, $BW_i$ (i=1, 2, ... n−1, n), and each of these bandwidths is less than $f_0-f_3$ and $f_4-f_0$. The relationship of the bandwidths of the sub-bands is:

$$BW_1<BW_2=BW_3<BW_4<\ldots<BW_i=BW_{i+1}<BW_{i+2}=BW_{i+3}<\ldots<BW_{n-3}<BW_{n-2}=BW_{n-1}<BW_n.$$

The power configured for the sub-bands is $P_1, P_2, \ldots, P_i, P_{i+1}, \ldots P_{n-1}, P_n$ respectively. The power configured for the sub-carriers in each sub-band is $p_1, p_2, \ldots, p_i, p_{i+1}, \ldots p_{n-1}$, and $p_n$ respectively. Since the sub-carrier intervals are equal in each sub-band, the power of the sub-carriers in each sub-band is also equal.

Then the step method in this embodiment is performed as follows:

1. the two sub-bands at the outmost of the TBC are configured: the sub-band $SB_1$ is configured immediately adjacent to the frequency point $f_3$, and any one, e.g., $SB_2$, of the two sub-bands $SB_2$ and $SB_3$, is configured immediately adjacent to the frequency point $f_4$;

2. the two sub-bands closest to the middle of the CB are configured: the $SB_n$ is configured on the left side closest to the DC sub-carrier, and any one, e.g., $SB_{n-1}$, of the two sub-bands $SB_{n-2}$ and $SB_{n-1}$ is configured on the right side closest to the DC sub-carrier;

3. the sub-bands at the rest positions of the TBC are configured: (x−2) SBs are finally configured in the remaining frequency range from the frequency point $f_3$ to the frequency point $f_{01}$ in an order in which the sub-carrier interval monotonically increases and in an order in which the bandwidth monotonically increases for different sub-bands having the same sub-carrier interval, and (n−x−2) SBs are finally configured in the remaining frequency range from the frequency point $f_4$ to the frequency point $f_{02}$ in an order in which the sub-carrier interval monotonically increases and in an order in which the bandwidth monotonically increases for different sub-bands having the same sub-carrier interval.

All the sub-bands are configured by means of the three steps described above, as shown in FIG. 5. In the frequency range from the frequency point $f_3$ to the frequency point $f_{01}$ and the frequency range from the frequency point $f_4$ to the frequency point $f_{02}$, the sub-carrier intervals of different sub-bands monotonically increase, and the bandwidths of different sub-bands with the same sub-carrier interval monotonically increase. That is, the sub-carrier intervals and the bandwidths in the frequency range from the frequency point $f_3$ to the frequency point $f_{01}$ satisfy $\Delta f_1=\Delta f_3 \ldots <\Delta f_i=\Delta f_{i+1}=\Delta f_{i+2}<\ldots<\Delta f_{n-1}$, and $BW_1<BW_3<\ldots<BW_i=BW_{i+1}<BW_{i+2}<BW_{n-1}$ respectively.

The sub-carrier intervals and the bandwidths in the frequency range from the frequency point $f_4$ to the frequency point $f_{02}$ satisfy $\Delta f_2=\Delta f_4 \ldots <\Delta f_{n-3}=\Delta f_{n-2}=\Delta f_n$ and $BW_2<BW_4<\ldots<BW_{n-3}<BW_{n-2}<BW_n$ respectively.

In addition, in the frequency range from the frequency point $f_3$ to the frequency point $f_{01}$ and the frequency range from the frequency point $f_4$ to the frequency point $f_{02}$, all the configured sub-bands may be placed continuously or discontinuously (that is, there is a certain guard interval between adjacent sub-bands). After all the sub-bands are configured, if $f_3-f_1=f_2-f_4$, the guard bands on both sides of the TBC are symmetrical; otherwise, the guard bands are asymmetrical.

After all the sub-bands are configured in the TBC, the power of the sub-carriers and the power of the sub-bands are configured. That is, the power in the frequency range from the frequency point $f_3$ to the frequency point $f_{01}$ satisfies: $p_1=p_3 \ldots <p_i=p_{i+1}=p_{i+2}<\ldots<p_{n-1}$, and the power in the frequency range from the frequency point $f_4$ to the frequency point $f_{02}$ satisfies: $p_2=p_4 \ldots <p_{n-3}=p_{n-2}=p_n$. The power of respective sub-carriers in all sub-bands satisfies: $p_1=p_2=p_3=p_4< \ldots <p_i=p_{i+1}=p_{i+2}=p_{i+3}< \ldots <p_{n-3}=p_{n-2}=p_{n-1}=p_n$. The power $P_n$ configured for each sub-band is proportional to the $BW_n$ of the sub-band.

Third Embodiment

In this embodiment, all time-frequency resources in the CB of a single carrier of the transmitting node send data.

In this embodiment, it is assumed that n (n>4) sub-bands are included in the TBC, and the sub-carrier intervals of respective sub-bands are not equal. When the radio resource is configured in the CB, the following steps are performed:

(1) when the BW of each sub-band is less than $f_{01}-f_3$ and less than $f_4-f_{02}$:

a) two sub-bands at the outmost of the TBC are configured: a sub-band having the smallest sub-carrier interval is configured on one side of the outmost of the TBC, and a sub-band having the second smallest sub-carrier interval is configured on the other side of the outmost of the TBC;

b) one sub-band closest to the middle of the CB is configured: a sub-band having the largest sub-carrier interval is configured at the frequency point $f_0$;

c) sub-bands at the rest positions of the TBC are configured: the remaining sub-bands are respectively and sequentially configured in the remaining frequency domain bandwidth of $f_{01}-f_3$ and $f_4-f_{02}$ in an order in which the sub-carrier interval monotonically increases until being filled, such that the sub-carrier intervals of all the different sub-bands monotonically increase in the remaining frequency ranges from the frequency point $f_3$ to the frequency point $f_{01}$ and from the frequency point $f_4$ to the frequency point $f_0$;

d) after the above steps are completed, power of all sub-bands are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band;

(2) when the BW of one of all the sub-bands is equal to $f_{01}-f_3$ or equal to $f_4-f_{02}$:

a) the sub-band with BW equal to $f_{01}-f_3$ is configured in the frequency domain range from the frequency point $f_3$ to the frequency point $f_0$, or the sub-band with BW equal to $f_4-f_0$ is configured in the frequency domain range from the frequency point $f_4$ to the frequency point $f_0$;

b) sub-bands on the other side of the outmost of the TBC are configured: a sub-band having the smallest sub-carrier interval in the remaining sub-bands is configured on the other side of the outmost of the TBC;

c) sub-bands at the rest positions of the TBC are configured: the remaining sub-bands are configured in the remaining frequency range of the TBC in an order in which the sub-carrier interval monotonically increases, such that the sub-carrier intervals of all the different sub-bands monotonically increase in the remaining frequency ranges from frequency point $f_3$ to frequency point $f_0$ or from frequency point $f_4$ to frequency point $f_0$;

d) power of all sub-bands are configured, such that each sub-carrier of a sub-band having a smaller sub-carrier interval is configured with smaller power, or each sub-carrier of a sub-band having a larger sub-carrier interval is configured with larger power, in addition, the configured power of each sub-band is in direct proportion to a bandwidth of the sub-band.

In the above configuration steps, all the sub-bands may be continuous or discontinuous (i.e. there is a certain guard interval between adjacent sub-bands). After the configuration of all the sub-bands is completed by means of the above steps, if $f_3-f_1=f_2-f_4$, the guard bands on both sides of the TBC are symmetrical; otherwise, the guard bands are asymmetrical.

When the sub-band at the outmost of the TBC is configured, no specific requirement is made on the corresponding relationship between the configured two sub-bands and the outmost of the TBC. For example, the sub-band having the smallest sub-carrier interval is sub-band $SB_1$, and the sub-band having the second smallest sub-carrier interval is sub-band $SB_2$, and then the sub-band $SB_1$ is configured immediately adjacent to the frequency point $f_3$, and the $SB_2$ is configured immediately adjacent to the frequency point $f_4$; or the $SB_1$ is configured immediately adjacent to the frequency point $f_4$, and the $SB_2$ is configured immediately adjacent to the frequency point $f_3$.

When the sub-band closest to the middle of the CB is configured, for the sub-band having the largest sub-carrier interval configured at the frequency point $f_0$, a center frequency point of this sub-band may or may not overlap with the frequency point $f_0$, and the specific situation may be adjusted dynamically according to the actual configuration, but a center frequency point of the CB is included in the frequency domain range of this sub-band.

The sub-bands at the rest positions of the TBC are configured, and for the remaining sub-bands, no specific requirement is made on which sub-bands are configured in the remaining frequency domain bandwidth of $f_0-f_3$ or $f_4-f_0$ either. That is, any one of these remaining sub-bands may be placed within the remaining frequency domain bandwidth of $f_0-f_3$ or $f_4-f_0$.

In an example, it is assumed that n (n>4) sub-bands are included in the TBC, and the sub-carrier intervals in respective sub-bands, SBs, are not equal. The sub-carrier intervals corresponding to the SBs are $\Delta f_1, \Delta f_2, \ldots, \Delta f_i, \Delta f_{i+1}, \ldots \Delta f_{n-1}, \Delta f_n$ respectively, and the relationship of these sub-carrier intervals is: $\Delta f_1 < \Delta f_2 \ldots < \Delta f_i < \Delta f_{i+1} < \ldots < \Delta f_{n-1} < \Delta f_n$.

The bandwidths of the sub-bands are $BW_1, BW_2, \ldots, BW_i, BW_{i+1}, \ldots BW_{n-1}, BW_n$, respectively, $BW_i$ (i=1, 2, ... n-1, n) is less than $f_0-f_3$ and less than $f_4-f_0$. The power configured for the sub-bands are $P_1, P_2, \ldots, P_i, P_{i+1}, \ldots P_{n-1}, P_n$ respectively. The power configured for sub-carriers in each sub-band is $p_1, p_2, \ldots, p_i, p_{i+1}, \ldots p_{n-1}, p_n$ respectively. Since the sub-carrier intervals are equal in each sub-band, the power of the sub-carriers in each sub-band is also equal.

Figure 6:
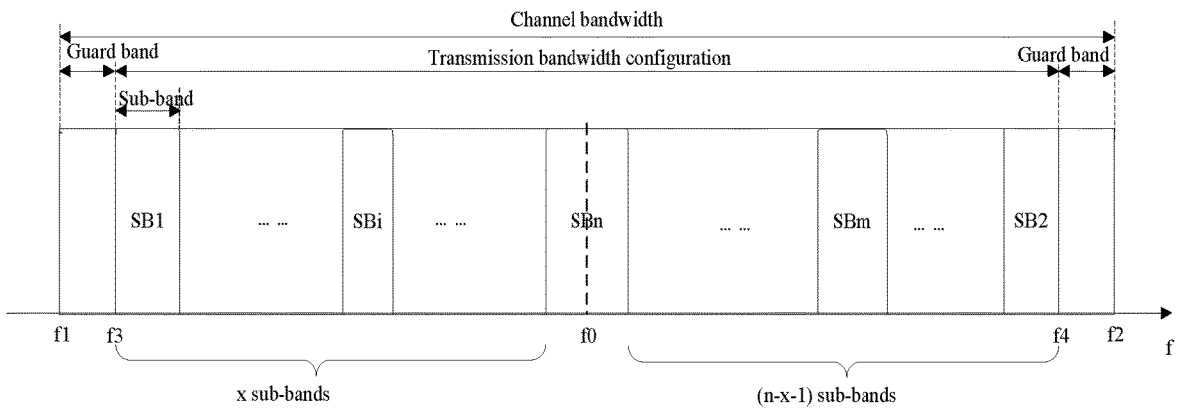
FIG. 6 is a schematic diagram III of a sub-band configuration within a channel bandwidth according to an embodiment of the present disclosure.
Figure 7:
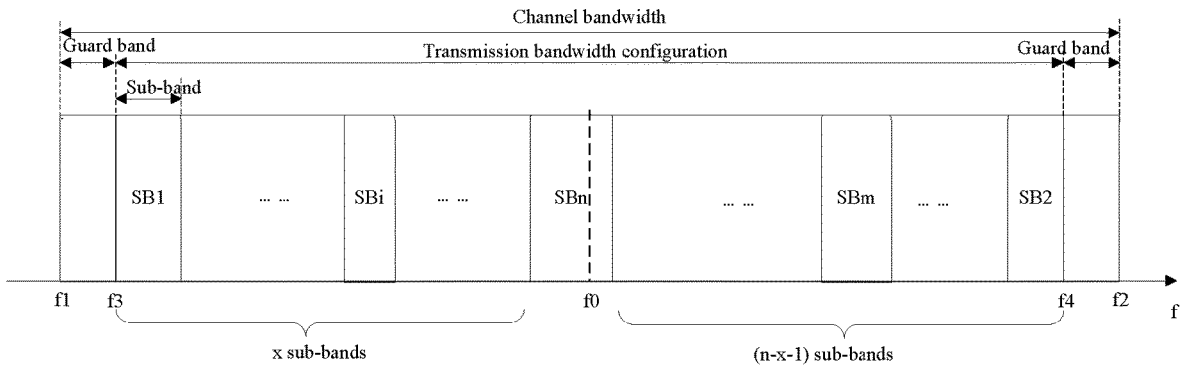
FIG. 7 is a schematic diagram IV of a sub-band configuration within a channel bandwidth according to an embodiment of the present disclosure.

Then the step method in this embodiment is performed as follows:

1. the two sub-bands at the outmost of the TBC are configured: the sub-band $SB_1$ is configured immediately adjacent to the frequency point $f_3$, and the sub-band $SB_2$ is configured immediately adjacent to the frequency point $f_4$;

2. the two sub-bands closest to the middle of the CB are configured: the sub-band $SB_n$ is configured at the frequency point $f_0$; the center frequency point of the sub-band $SB_n$ may overlap with the center frequency point of the CB, as shown in FIG. 6; the center frequency point of the sub-band $SB_n$ may not overlap with the center frequency point of the CB, as shown in FIG. 7;

3. the sub-bands at the rest positions of the TBC are configured: and (x−1) SBs are finally configured in the remaining frequency range from the frequency point $f_3$ to the frequency point $f_0$ in an order in which the sub-carrier interval monotonically increases, and (n−x−2) SBs are finally configured in the remaining frequency range from the frequency point $f_4$ to the frequency point $f_0$ in an order in which the sub-carrier interval monotonically increases.

All the sub-bands are configured by means of the three steps described above, as shown in FIGS. 6 and 7. In the frequency range from the frequency point $f_3$ to the frequency point $f_0$ and the frequency range from the frequency point $f_4$ to the frequency point $f_0$, the sub-carrier intervals of different sub-bands in all the configured sub-bands monotonically increase. That is, the sub-carrier intervals in the frequency range from the frequency point $f_3$ to the frequency point $f_0$: $\Delta f_1 < \ldots < \Delta f_i < \ldots < \Delta f_n$, and the sub-carrier intervals in the frequency range from the frequency point $f_4$ to the frequency point $f_0$ satisfy: $\Delta f_2 < \ldots < \Delta f_m < \ldots < \Delta f_n$.

In addition, in the frequency range from the frequency point $f_3$ to the frequency point $f_0$ and the frequency range from the frequency point $f_4$ to the frequency point $f_0$, all the configured sub-bands may be placed continuously or discontinuously (that is, there is a certain guard interval between adjacent sub-bands). After all the sub-bands are configured, if $f_3-f_1=f_2-f_4$, the guard bands on both sides of the TBC are symmetrical; otherwise, the guard bands are asymmetrical.

After all the sub-bands are configured, the power of the sub-carriers and the power of the sub-bands are configured. That is, the power in the frequency range from the frequency point $f_3$ to the frequency point $f_0$ satisfies: $p_1 < \ldots < p_i < \ldots < p_n$, and the power in the frequency range from the frequency point $f_4$ to the frequency point $f_0$ satisfies: $p_2 < \ldots < p_m < \ldots < p_{n-1}$, moreover, $p_1 < p_2 < \ldots < p_i < p_{i+1} < \ldots < p_{n-1} < p_n$. The power $P_n$ allocated for each sub-band is proportional to $BW_n$ of the sub-band.

Fourth Embodiment

In this embodiment, all time-frequency resources in the CB of a single carrier of the transmitting node send data.

In this embodiment, it is assumed that n (n>4) sub-bands are included in the TBC, and the sub-carrier intervals of respective sub-band are not equal.

When the radio resource is configured in the CB, the following steps are performed:

(1) when the BW of each sub-band is less than $f_{01}-f_3$ and less than $f_4-f_{02}$:

a) two sub-bands at the outmost of the TBC are configured: a sub-band having the smallest sub-carrier interval is configured on one side of the outmost of the TBC, and a sub-band having the second smallest sub-carrier interval is configured on the other side of the outmost of the TBC;

b) two sub-bands closest to the middle of the CB is configured: a sub-band having the largest sub-carrier interval is configured on one side closest to the frequency point $f_0$, and a sub-band having the second largest sub-carrier interval is configured on the other side closest to the frequency point $f_0$;

c) sub-bands at the rest positions of the TBC are configured: the remaining sub-bands are respectively and sequentially configured in the remaining frequency domain bandwidth of $f_0$–$f_3$ and $f_4$–$f_0$ in an order in which the sub-carrier interval monotonically increases until being filled, such that the sub-carrier intervals of all the different sub-bands monotonically increase in the remaining frequency ranges from the frequency point $f_3$ to the frequency point $f_0$ or from the frequency point $f_4$ to the frequency point $f_0$;

d) after the above steps are completed, power of all sub-band are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band;

(2) when the BW of one of all the sub-bands is equal to $f_0$–$f_3$ or equal to $f_4$–$f_0$:

a) the sub-band with BW equal to $f_0$–$f_3$ is configured in the frequency domain range from the frequency point $f_3$ to the frequency point $f_0$, or the sub-band with BW equal to $f_4$–$f_0$ is configured in the frequency domain range from the frequency point $f_4$ to the frequency point $f_0$;

b) sub-bands on the other side of the outmost of the TBC are configured: a sub-band having the smallest sub-carrier interval in the remaining sub-bands is configured on the other side of the outmost of the TBC;

c) sub-bands at the rest positions of the TBC are configured: the remaining sub-bands are configured in the remaining frequency range of the TBC in an order in which the sub-carrier interval monotonically increases, such that the sub-carrier intervals of all the different sub-bands monotonically increase in the remaining frequency ranges from frequency point $f_3$ to frequency point $f_0$ or from frequency point $f_4$ to frequency point $f_0$;

d) power of all sub-bands are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band.

In the above configuration steps, all the sub-bands may be continuous or discontinuous (i.e. there is a certain guard interval between adjacent sub-bands). After the configuration of all the sub-bands is completed by means of the above steps, if $f_3$–$f_1$=$f_2$–$f_4$, the guard bands on both sides of the TBC are symmetrical; otherwise, the guard bands are asymmetrical.

When the sub-band at the outmost of the TBC is configured, no specific requirement is made on the corresponding relationship between the configured two sub-bands and the outmost of the TBC. For example, the sub-band having the smallest sub-carrier interval is sub-band $SB_1$, and the sub-band having the second smallest sub-carrier interval is sub-band $SB_2$, and then the sub-band $SB_1$ is configured immediately adjacent to the frequency point $f_3$, and the $SB_2$ is configured immediately adjacent to the frequency point $f_4$; or the $SB_1$ is configured immediately adjacent to the frequency point $f_4$, and the $SB_2$ is configured immediately adjacent to the frequency point $f_3$.

When the sub-band closest to the middle of the CB is configured, no specific requirement is made on the corresponding relationship between the configured two sub-bands and the positions of the two sides closest to the middle of the CB. For example, the sub-band having the largest sub-carrier interval is sub-band $SR_n$, the sub-band having the second largest sub-carrier interval is sub-band $SB_{n-1}$, and then the $SB_n$ is configured on the left side closest to the frequency point $f_0$, and the $SB_{n-1}$ is configured on the right side closest to the frequency point $f_0$; or the $SB_{n-1}$ is configured on the left side closest to the frequency point $f_0$, and the $SB_n$ is configured on the right side closest to the frequency point $f_0$.

The sub-bands at the rest positions of the TBC are configured, and for the remaining sub-bands, no specific requirement is made on which sub-bands are configured in the remaining frequency domain bandwidth of $f_0$–$f_3$ or $f_4$–$f_0$ either. That is, any one of these remaining sub-bands may be placed within the remaining frequency domain bandwidth of $f_0$–$f_3$ or $f_4$–$f_0$.

In an example, it is assumed that n (n>4) sub-bands are included in the TBC, and the sub-carrier intervals in respective sub-bands are not equal. The sub-carrier intervals corresponding to the SBs are $\Delta f_1, \Delta f_2, \ldots, \Delta f_i, \Delta f_{i+1}, \ldots \Delta f_{n-1}, \Delta f_n$ respectively, and the relationship of these SBs is: $\Delta f_1 < \Delta f_2 \ldots < \Delta f_i < \Delta f_{i+1} < \ldots < \Delta f_{n-1} < \Delta f_n$.

The bandwidths of the sub-bands are $BW_1, BW_2, \ldots, BW_i, BW_{i+1}, \ldots BW_{n-1}, BW_n$ respectively, and each of these bandwidths is less than $f_0$–$f_3$ and $f_4$–$f_0$. The power configured for the sub-bands are $P_1, P_2, \ldots, P_i, P_{i+1}, \ldots P_{n-1}, P_n$ respectively. The power configured for sub-carriers in each sub-band is $p_1, p_2, \ldots, p_i, p_{i+1}, \ldots p_{n-1}, p_n$ respectively. Since the sub-carrier intervals are equal in each sub-band, the power of the sub-carriers in each sub-band is also equal.

Then the step method in this embodiment is performed as follows:

1. the two sub-bands at the outmost of the TBC are configured: the sub-band $SB_1$ is configured immediately adjacent to the frequency point $f_3$, and the sub-band $SB_2$ is configured immediately adjacent to the frequency point $f_4$;

2. the two sub-bands closest to the middle of the CB are configured: the sub-band $SB_n$ is configured on the left side closest to the frequency point $f_0$, and the sub-band $SB_{n-1}$ is configured on the right side closest to the frequency point $f_0$;

3. the sub-bands at the rest positions of the TBC are configured: and (x−2) SBs are finally configured in the remaining frequency range from the frequency point $f_3$ to the frequency point $f_0$ in an order in which the sub-carrier interval monotonically increases, and (n−x−2) SBs are finally configured in the remaining frequency range from the frequency point $f_4$ to the frequency point $f_0$ in an order in which the sub-carrier interval monotonically increases.

Figure 8:
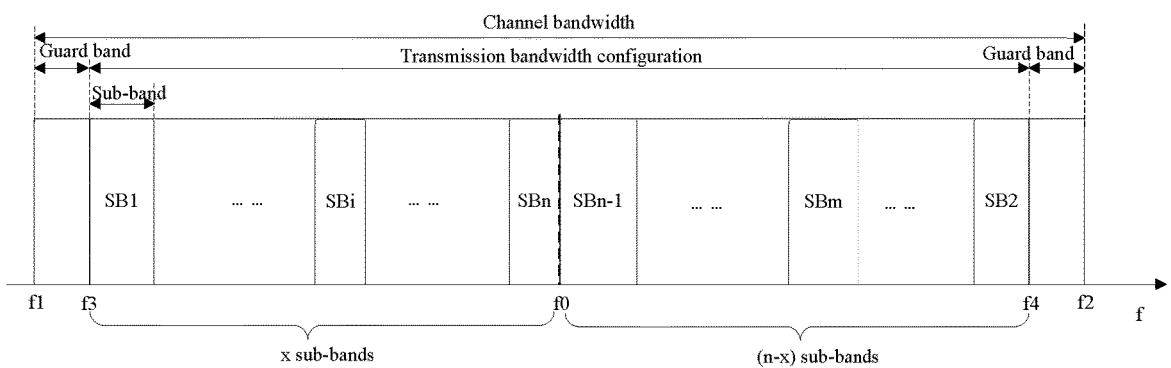
FIG. 8 is a schematic diagram V of a sub-band configuration within a channel bandwidth according to an embodiment of the present disclosure.

All the sub-bands are configured by means of the three steps described above, as shown in FIG. 8. In the frequency range from the frequency point $f_3$ to the frequency point $f_0$ and the frequency range from the frequency point $f_4$ to the frequency point $f_0$, the sub-carrier intervals of different sub-bands in all the configured sub-bands monotonically increase. That is, in FIG. 8, the sub-carrier intervals in the frequency range from the frequency point $f_3$ to the frequency point $f_0$ satisfy: $\Delta f_1 < \ldots < \Delta f_i < \ldots < \Delta f_n$, and the sub-carrier intervals in the frequency range from the frequency point $f_4$ to the frequency point $f_0$: $\Delta f_2 < \ldots < \Delta f_m < \ldots < \Delta f_{n-1}$.

In addition, in the frequency range from the frequency point $f_3$ to the frequency point $f_0$ and the frequency range from the frequency point $f_4$ to the frequency point $f_0$, all the configured sub-bands may be placed continuously or discontinuously (that is, there is a certain guard interval between adjacent sub-bands). After all the sub-bands are configured, if $f_3$–$f_1$=$f_2$–$f_4$, the guard bands on both sides of the TBC are symmetrical; otherwise, the guard bands are asymmetrical.

After all the sub-bands are configured, the power of the sub-carriers and the power of the sub-bands are configured. That is, the power in the frequency range from the frequency point $f_3$ to the frequency point $f_0$ satisfies: $p_1 < \ldots < p_i < \ldots < p_n$, and the power in the frequency range from the frequency point $f_4$ to the frequency point $f_0$ satisfies: $p_2 < \ldots < p_m < \ldots < p_{n-1}$; moreover, $p_1 < p_2 < \ldots < p_i < p_{i+1} < \ldots < p_{n-1} < p_n$. The power $P_n$ allocated for each sub-band is proportional to $BW_n$ of the sub-band.

Fifth Embodiment

In the present embodiment, a supplementary description will be given for the case of n<=4 in the third embodiment and the fourth embodiment described above.

In this embodiment, all time-frequency resources in the CB of a single carrier of the transmitting node send data.

In this embodiment, it is assumed that n sub-bands are included in the TBC, and the sub-carrier intervals of respective sub-bands are not equal.

(1) If n=2, when the radio resource is configured in the CB, the following steps are performed:

(1.1) these two sub-bands are configured in frequency domain ranges from frequency point $f_3$ to frequency point $f_0$ and from frequency point $f_4$ to frequency point $f_0$, respectively;

(1.2) power of the sub-bands is configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band.

(2) If n=3 or 4, when the radio resource is configured in the CB, the following steps are performed:

(2.1) when the BW of each sub-band is less than $f_0-f_3$ and less than $f_4-f_0$:

a) two sub-bands at the outmost of the TBC are configured: a sub-band having the smallest sub-carrier interval is configured on one side of the outmost of the TBC, and a sub-band having the second smallest sub-carrier interval is configured on the other side of the outmost of the TBC;

b) sub-bands at the rest positions of the TBC are configured: the remaining sub-bands are configured in the remaining frequency range of the TBC such that a sub-band having the largest sub-carrier interval is configured closest to the frequency point $f_0$;

c) power of the sub-bands are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band;

(2.2) when the BW of one of all the sub-bands is equal to $f_0-f_3$ or equal to $f_4-f_0$:

a) the sub-band with BW equal to $f_0-f_3$ is configured in the frequency domain range from the frequency point $f_3$ to the frequency point $f_0$, or the sub-band with BW equal to $f_4-f_0$ is configured in the frequency domain range from the frequency point $f_4$ to the frequency point $f_0$;

b) sub-bands on the other side of the outmost of the TBC are configured: a sub-band having the smallest sub-carrier interval in the remaining sub-bands is configured on the other side of the outmost of the TBC;

c) sub-bands at the rest positions of the TBC are configured: the remaining sub-bands are configured in the remaining frequency range of the TBC in an order in which the sub-carrier interval monotonically increases, such that the sub-carrier intervals of all the different sub-bands monotonically increase in the remaining frequency ranges from frequency point $f_3$ to frequency point $f_0$ or from frequency point $f_4$ to frequency point $f_0$;

d) power of the sub-bands are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band.

In the above configuration steps, all the sub-bands may be continuous or discontinuous (i.e. there is a certain guard interval between adjacent sub-bands). After the configuration of all the sub-bands is completed by means of the above steps, if $f_3-f_1=f_2-f_4$, the guard bands on both sides of the TBC are symmetrical; otherwise, the guard bands are asymmetrical.

Sixth Embodiment

In this embodiment, all time-frequency resources in the CB of a single carrier of the transmitting node send data.

In this embodiment, it is assumed that n (n>4) sub-bands are included in the TBC, and at least two sub-bands of all the sub-bands have the same sub-carrier interval, and the sub-carrier intervals of different sub-bands are not all equal.

When the radio resource is allocated in the CB, the following steps are performed:

(1) when the BW of each sub-band is less than $f_0-f_3$ and less than $f_4-f_0$:

a) two sub-bands at the outmost of the TBC are configured:

i. in a case where sub-bands with the same sub-carrier interval have the smallest sub-carrier interval:

if some of these sub-bands have the same and smallest bandwidth, then any one of these sub-bands with the same bandwidth is configured on both sides of the outmost of the TBC.

if some of these sub-bands have the same bandwidth but not the smallest bandwidth, then one of the sub-bands with the smallest bandwidth is configured on one side of the outmost of the TBC, and one of the sub-bands with the second smallest bandwidth is configured on the other side of the outmost of the TBC;

if none of the bandwidths of these sub-carriers are equal, then one of the sub-bands with the smallest bandwidth is configured on one side of the outmost of the TBC, and one of the sub-bands with the second smallest bandwidth is configured on the other side of the outmost of the TBC;

if the bandwidths of all of these sub-bands are equal, then any two sub-bands with the same bandwidth are configured on both sides of the outmost of the TBC;

ii. if sub-bands having the same sub-carrier interval do not have the smallest sub-carrier interval, then a sub-band having the smallest sub-carrier interval is configured on one side of the outmost of the TBC, and a sub-band having the second smallest sub-carrier interval is configured on the other side of the outmost of the TBC;

b) one sub-band closest to the middle of the CB is configured:

i. in a case where sub-bands having the same sub-carrier interval have the largest sub-carrier interval:

if some of these sub-bands have the same and largest bandwidth, then any one of these sub-bands is configured at the frequency point $f_0$;

if some of these sub-bands have the same bandwidth but not the larges bandwidth, then one sub-band having the largest bandwidth is configured at the frequency point $f_0$;

if none of the bandwidths of these sub-carriers are equal, then one sub-band with the largest bandwidth is configured at the frequency point $f_0$;

if the bandwidths of all these sub-bands are equal, then any one of these sub-bands is configured at the frequency point $f_0$.

ii. if sub-bands having the same sub-carrier interval do not have the largest sub-carrier interval, then one sub-band with the largest bandwidth is configured at the frequency point $f_0$;

c) sub-bands at the rest positions of the TBC are configured: the remaining sub-bands are respectively and sequentially configured in the remaining frequency domain bandwidth of $f_0-f_3$ and $f_4-f_0$ in an order in which the sub-carrier interval monotonically increases and in an order in which the bandwidth monotonically increases for different sub-bands having the same sub-carrier interval until being filled, such that the sub-carrier intervals of all the different sub-bands monotonically increase and the bandwidths of different sub-bands having the same sub-carrier interval monotonically increase in the remaining frequency ranges from the frequency point $f_3$ to the frequency point $f_0$ or from the frequency point $f_4$ to the frequency point $f_0$;

d) after the above steps are completed, power of all sub-bands are configured, such that the power configured for the sub-carriers in different sub-bands having the same sub-carrier interval is equal; meanwhile, each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band;

(2) when the BW of one of all the sub-bands is equal to $f_0-f_3$ or equal to $f_4-f_0$:

a) the sub-band with BW equal to $f_0-f_3$ is configured in the frequency domain range from the frequency point $f_3$ to the frequency point $f_0$, or the sub-band with BW equal to $f_4-f_0$ is configured in the frequency domain range from the frequency point $f_4$ to the frequency point $f_0$;

b) sub-bands on the other side of the outmost of the TBC are configured:

i. in a case where sub-bands having the same sub-carrier interval is configured with the smallest sub-carrier interval:

if some of these sub-bands have the same and smallest bandwidth, then any one of these sub-bands with the same bandwidth is configured on the other side of the outmost of the TBC;

If some of these sub-bands have the same bandwidth but not the smallest bandwidth, then one of the sub-bands with the smallest bandwidth is configured on the other side of the outmost of the TBC;

if none of the bandwidths of these sub-carriers are equal, then one of the sub-bands with the smallest bandwidth is configured on the other side of the outmost of the TBC;

if the bandwidths of all these sub-bands are equal, then any one of these sub-bands with the same bandwidth is configured on the other side of the outmost of the TBC;

ii. if sub-bands having the same sub-carrier interval do not have the smallest sub-carrier interval, then one of the sub-bands having the smallest sub-carrier interval is configured on the other side of the outmost of the TBC;

c) sub-bands at the rest positions of the TBC are configured: the remaining sub-bands are configured in the remaining frequency range of the TBC in an order in which the sub-carrier interval monotonically increases and in an order in which the bandwidth monotonically increases for different sub-bands having the same sub-carrier interval, such that the sub-carrier intervals of all different sub-bands monotonically increase and the bandwidths of different sub-bands having the same sub-carrier interval monotonically increase in the remaining frequency range from frequency point $f_3$ to frequency point $f_0$ or from frequency point $f_4$ to frequency point $f_0$;

d) power of all sub-bands are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band.

In the above configuration steps, all the sub-bands may be continuous or discontinuous (i.e. there is a certain guard interval between adjacent sub-bands). After the configuration of all the sub-bands is completed by means of the above steps, if $f_3-f_1=f_2-f_4$, the guard bands on both sides of the TBC are symmetrical, otherwise, the guard bands are asymmetrical. When the sub-band at the outmost of the TBC is configured, no specific requirement is made on the corresponding relationship between the configured two sub-bands and the outmost of the TBC.

It is assumed that there are 4 SBs ($SB_1 \sim SB_4$) having the same and smallest sub-carrier interval, i.e., $\Delta f_1 = f_2 = f_3 = \Delta f_4 \ldots < \Delta f_n$. Examples are as follows:

1) if some of these sub-bands have the same and smallest bandwidth, e.g., $BW_1 = BW_2 = BW_3 < BW_4$, then any two of three sub-bands $SB_1$, $SB_2$, and $SB_3$ are configured immediately adjacent to the frequency point $f_3$ and the frequency point $f_4$;

2) if none of the bandwidths of these sub-carriers are equal, e.g., $BW_1 < BW_2 < BW_3 < BW_4$, then the sub-band $SB_1$ is configured immediately adjacent to the frequency point $f_3$ and the sub-band $SB_2$ is configured immediately adjacent to the frequency point $f_4$; alternatively, the sub-band $SB_1$ is configured immediately adjacent to the frequency point $f_4$ and the sub-band $SB_2$ is configured immediately adjacent to the frequency point $f_3$;

3) if some of these sub-bands have the same bandwidth but not the smallest bandwidth, e.g., $BW_1 < BW_2 = BW_3 < BW_4$, then the sub-band $SB_1$ is configured immediately adjacent to the frequency point $f_3$, and the sub-band $SB_2$ or the sub-band $SB_3$ is configured immediately adjacent to the frequency point $f_4$; alternatively, the sub-band $SB_1$ is configured immediately adjacent to the frequency point $f_4$, and the sub-band $SB_2$ or the sub-band $SB_3$ is configured immediately adjacent to the frequency point $f_3$;

4) if the bandwidths of all these sub-bands are equal, e.g., $BW_1 = BW_2 = BW_3 = BW_4$, then any two of the four sub-bands are configured immediately adjacent to the frequency point $f_4$ and the frequency point $f_3$.

It is assumed that sub-bands having the same sub-carrier interval do not have the smallest sub-carrier interval, the sub-band having the smallest sub-carrier interval is configured on one side of the outmost of the TBC, and the sub-band having the second smallest sub-carrier interval is configured on the other side of the outmost of the TBC. That is, the sub-carrier intervals of the two sub-bands configured at the outermost of the TBC are different.

When the sub-band closest to the middle of the CB is configured, for the sub-band having the largest sub-carrier interval configured at the frequency point $f_0$, a center frequency point of this sub-band may or may not overlap with the frequency point $f_0$, and the specific situation may be adjusted dynamically according to the actual configuration, but the frequency point $f_0$ is included in the frequency domain range of this sub-band.

It is assumed that there are 4 SBs ($SB_{n-3} \sim SB_n$) having the same and the largest sub-carrier interval, i.e., $\Delta f_1 \ldots < \Delta f_{n-3} = \Delta f_{n-2} = \Delta f_{n-1} = \Delta f_n$. Examples are as follows:

1) if some of these sub-bands have the same and largest bandwidth, e.g., $BW_{n-3} < BW_{n-2} = BW_{n-1} = BW_n$, then any one of the three sub-bands $SB_n$, $SB_{n-1}$ and $SB_{n-2}$ are configured in the middle of the CB;

2) if the bandwidths of these sub-bands are not equal, e.g., $BW_{n-3} < BW_{n-2} < BW_{n-1} < BW_n$, then the sub-band $BW_n$ is configured in the middle of the CB;

3) if some of these sub-bands have the same bandwidth but not the largest bandwidth, e.g., $BW_{n-3} < BW_{n-2} = BW_{n-1} < BW_n$, then the sub-band $BW_n$ is configured in the middle of the CB;

4): if the bandwidths of all these sub-bands are equal, e.g., $BW_{n-3} = BW_{n-2} = BW_{n-1} = BW_n$, then any one of the four sub-bands is configured in the middle of the CB.

It is assumed that sub-bands having the same sub-carrier interval doe not have the largest sub-carrier interval, a sub-band having a largest sub-carrier interval is configured in the middle of the CB.

The sub-bands at the rest positions of the TBC are configured, and for the remaining sub-bands, no specific requirement is made on the sub-bands configured in the remaining frequency domain bandwidth of $f_0-f_3$ or $f_4-f_0$ either. That is, any one of these remaining sub-bands may be placed within the remaining frequency domain bandwidth of $f_0-f_3$ or $f_4-f_0$.

The configuration of all the sub-bands is completed by means of the above steps, all the sub-bands in the TBC may be placed continuously or discontinuously (i.e. there is a certain guard interval between adjacent sub-bands). After all the sub-bands are configured by means of the above steps, if $f_3-f_1=f_2-f_4$, the guard bands on both sides of the TBC are symmetrical; otherwise, the guard bands are asymmetrical.

In an example, it is assumed that n (n>4) sub-bands, SBs, are included in the TBC, the sub-carrier intervals are $\Delta f_1$, $\Delta f_2$, $\Delta f_3$, $\Delta f_4$, ..., $\Delta f_i$, $\Delta f_{i+1}$, $\Delta f_{i+2}$, $\Delta f_{i+3}$, ... $\Delta f_{n-3}$, $\Delta f_{n-2}$, $\Delta f_{n-1}$, $\Delta f_n$ respectively. The relationship of these sub-carrier intervals is:

$$\Delta f_1 = \Delta f_2 = \Delta f_3 = \Delta f_4 < \ldots < \Delta f_i = \Delta f_{i+1} = \Delta f_{i+2} = \Delta f_{i+3} < \ldots < \Delta f_{n-3} = \Delta f_{n-2} = \Delta f_{n-1} = \Delta f_n.$$

All the n sub-bands (SBs) are numbered according to the corresponding relation of the sub-carrier intervals, i.e., the sub-carrier interval corresponding to the $SB_i$ is $\Delta f_i$, i=1, 2, ... n−1, n.

The bandwidths of the sub-bands are: $BW_1$, $BW_2$, $BW_3$, $BW_4$, ..., $BW_i$, $BW_{i+1}$, $BW_{i+2}$, $BW_{i+3}$, ... $BW_{n-3}$, $BW_{n-2}$, $BW_{n-1}$, $BW_n$ respectively, $BW_i$ (i=1, 2, ... n−1, n), and each of these bandwidths is less than $f_0-f_3$ and $f_4-f_0$. The relationship of the bandwidths of the sub-bands is:

$$BW_1 < BW_2 = BW_3 < BW_4 < \ldots < BW_i = BW_{i+1} < BW_{i+2} BW_{i+3} = \ldots < BW_{n-3} < BW_{n-2} = BW_{n-1} = BW_n.$$

The power configured for the sub-bands is $P_1$, $P_2$, ..., $P_i$, $P_{i+1}$, ... $P_{n-1}$, $P_n$ respectively. The power configured for the sub-carriers in each sub-band is $p_1$, $p_2$, ..., $p_i$, $p_{i+1}$, ... $p_{n-1}$, $p_n$ respectively. Since the sub-carrier intervals are equal in each sub-band, the power of the sub-carriers in each sub-band is also equal.

Figure 9:
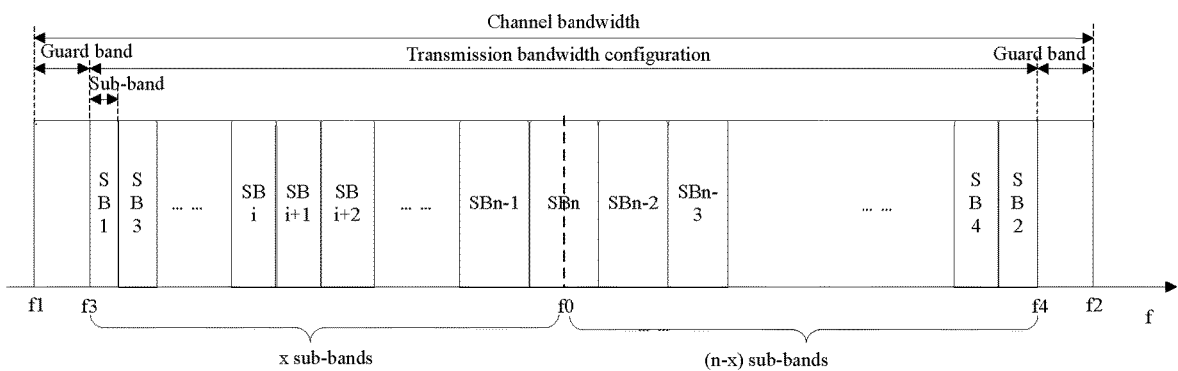
FIG. 9 is a schematic diagram VI of a sub-band configuration within a channel bandwidth according to an embodiment of the present disclosure.
Figure 10:
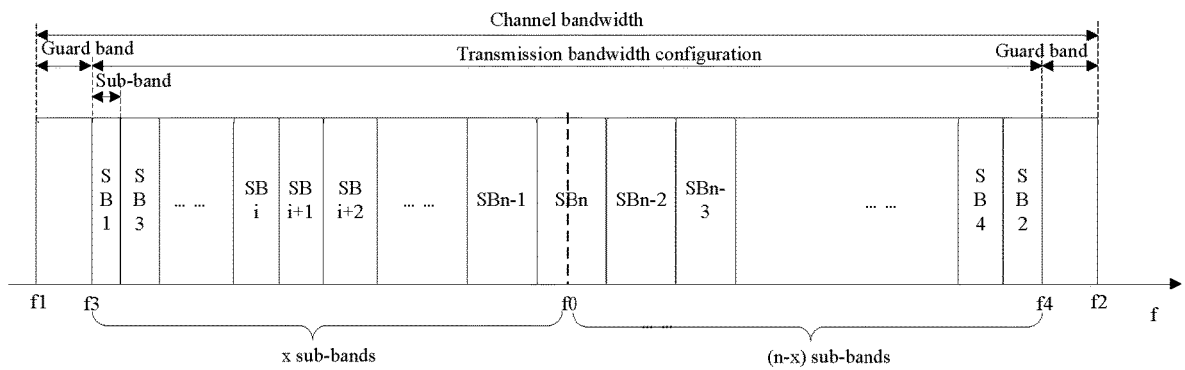
FIG. 10 is a schematic diagram VII of a sub-band configuration within a channel bandwidth according to an embodiment of the present disclosure.

Then the step method in this embodiment is performed as follows:

1. the two sub-bands at the outmost of the TBC are configured: the sub-band $SB_1$ is configured immediately adjacent to the frequency point $f_3$, and any one, e.g., $SB_2$, of the two sub-bands $SB_2$ and $SB_3$ is configured immediately adjacent to the frequency point $f_4$;

2. one sub-band in the middle of the CB is configured: any one, e.g., $SB_n$, of the three sub-bands $SB_n$, $SB_{n-1}$ and $SB_{n-2}$ is configured in the middle of the CB; the center frequency point of the sub-band $SB_n$ may be overlap with the center frequency point of the CB, as shown in FIG. 9; the center frequency point of the sub-band $SB_n$ may not overlap with the center frequency point of the CB either, as shown in FIG. 10;

3. the sub-bands at the rest positions of the TBC are configured: and (x−1) SBs are finally configured in the remaining frequency range from the frequency point $f_3$ to the frequency point $f_0$ in an order in which the sub-carrier interval monotonically increases and in an order in which the bandwidth monotonically increases for different sub-bands having the same sub-carrier interval, and (n−x−2) SBs are finally configured in the remaining frequency range from the frequency point $f_4$ to the frequency point $f_0$ in an order in which the sub-carrier interval monotonically increases and in an order in which the bandwidth monotonically increases for different sub-bands having the same sub-carrier interval.

All the sub-bands are configured by means of the three steps described above, as shown in FIGS. 9 and 10. In the frequency range from the frequency point $f_3$ to the frequency point $f_0$ and the frequency range from the frequency point $f_4$ to the frequency point $f_0$, among all the configured sub-bands, the sub-carrier intervals of different sub-bands monotonically increase, and the bandwidths of different sub-bands with the same sub-carrier interval monotonically increase. That is, the sub-carrier intervals and the bandwidths in the frequency range from the frequency point $f_3$ to the frequency point $f_0$ satisfy: $\Delta f_1 = \Delta f_3 \ldots < \Delta f_i = \Delta f_{i+1} = \Delta f_{i+2} < \ldots < \Delta f_n$, and $BW_1 < BW_3 < \ldots < BW_i = BW_{i+1} < BW_{i+2} < BW_{n-1} = BW_n$ respectively.

The sub-carrier intervals and the bandwidths in the frequency range from the frequency point $f_4$ to the frequency point $f_0$ satisfy: $\Delta f_2 = \Delta f_4 \ldots < \Delta f_{n-3} = \Delta f_{n-2} = \Delta f_n$ and $BW_2 < BW_4 < \ldots < BW_{n-3} < BW_{n-2} = BW_n$ respectively.

In addition, in the frequency range from the frequency point $f_3$ to the frequency point $f_0$ and the frequency range from the frequency point $f_4$ to the frequency point $f_0$, all the configured sub-bands may be placed continuously or discontinuously (that is, there is a certain guard interval between adjacent sub-bands). After all the sub-bands are configured, if $f_3-f_1=f_2-f_4$, the guard bands on both sides of the TBC are symmetrical; otherwise, the guard bands are asymmetrical.

After all the sub-bands are configured in the TBC, the power of the sub-carriers and the power of the sub-bands are configured. That is, the power in the frequency range from the frequency point $f_3$ to the frequency point $f_0$ satisfies: $p_1 = p_3 \ldots < p_i = p_{i+1} = p_{i+2} < \ldots < p_{n-1} = p_n$, and the power in the frequency range from the frequency point $f_4$ to the frequency point $f_0$ satisfies: $p_2 = p_4 \ldots < p_{n-3} = p_{n-2} = p_n$. The power of respective sub-carriers in all sub-bands satisfies: $p_1 = p_2 = p_3 = p_4 < \ldots < p_i = p_{i+1} = p_{i+2} = p_{i+3} < \ldots < p_{n-3} = p_{n-2} = p_{n-1} = p_n$. The power $P_n$ configured for each sub-band is proportional to the $BW_n$ of the sub-band.

Seventh Embodiment

In this embodiment, all time-frequency resources in the CB of a single carrier of the transmitting node send data.

In this embodiment, it is assumed that n (n>4) sub-bands are included in the TBC, and at least two sub-bands of all the sub-bands have the same sub-carrier interval, and the sub-carrier intervals of different sub-bands are not all equal.

When the radio resource is allocated in the CB, the following steps are performed:

(1) when the BW of each sub-band is less than $f_0-f_3$ and less than $f_4-f_0$:

a) two sub-bands at the outmost of the TBC are configured:

i. in a case where sub-bands having the same sub-carrier interval have the smallest sub-carrier interval:

if some of these sub-bands have the same and smallest bandwidth, then any two of these sub-bands with the same bandwidth is configured on both sides of the outmost of the TBC;

if some of these sub-bands have the same bandwidth but not the smallest bandwidth, then one of the sub-bands with the smallest bandwidth is configured on one side of the outmost of the TBC, and one of the sub-bands with the second smallest bandwidth is configured on the other side of the outmost of the TBC;

if none of the bandwidths of these sub-carriers are equal, then one of the sub-bands with the smallest bandwidth is configured on one side of the outmost of the TBC, and one of the sub-bands with the second smallest bandwidth is configured on the other side of the outmost of the TBC;

if the bandwidths of all of these sub-bands are equal, then any two sub-bands with the same bandwidth are configured on both sides of the outmost of the TBC;

ii. if sub-bands having the same sub-carrier interval do not have the smallest sub-carrier interval, then a sub-band having the smallest sub-carrier interval is configured on one side of the outmost of the TBC, and a sub-band having the second smallest sub-carrier interval is configured on the other side of the outmost of the TBC;

b) two sub-bands closest to the middle of the CB are configured:

i. in a case where sub-bands having the same sub-carrier interval have the largest sub-carrier interval:

if some of these sub-bands have the same and largest bandwidth, then any two of these sub-bands with the largest bandwidth is configured on two sides closest to the frequency point $f_0$;

if some of these sub-bands have the same bandwidth but not the largest bandwidth, then a sub-band with the largest bandwidth is configured on one side closest to the frequency point $f_0$, a sub-band with the second largest bandwidth is configured on the other side closest to the frequency point $f_0$;

if none of the bandwidths of these sub-carriers are equal, then a sub-band with the largest bandwidth is configured on one side closest to the frequency point $f_0$, a sub-band with the second largest bandwidth is configured on the other side closest to the frequency point $f_0$;

if the bandwidths of all these sub-bands are equal, then any two of these sub-bands with the same bandwidth is configured on two sides closest to the frequency point $f_0$;

ii, if sub-bands having the same sub-carrier interval do not have the largest sub-carrier interval, then a sub-band with the largest bandwidth is configured on one side of two sides closest to the frequency point $f_0$, a sub-band with the second largest bandwidth is configured on the other side of two sides closest to the frequency point $f_0$;

c) sub-bands at the rest positions of the TBC are configured: the remaining sub-bands are respectively and sequentially configured in the remaining frequency domain bandwidth of $f_0-f_3$ and $f_4-f_0$ in an order in which the sub-carrier interval monotonically increases and in an order in which the bandwidth monotonically increases for different sub-bands having the same sub-carrier interval until being filled, such that the sub-carrier intervals of all the different sub-bands monotonically increase and the bandwidths of different sub-bands having the same sub-carrier interval monotonically increase in the remaining frequency ranges from the frequency point $f_3$ to the frequency point $f_0$ or from the frequency point $f_4$ to the frequency point $f_0$;

d) after the above steps are completed, power of all sub-bands are configured, such that the power configured for the sub-carriers in different sub-bands having the same sub-carrier interval is equal; meanwhile, each sub-carrier of a sub-band having a smaller sub-carrier interval is configured with smaller power, or each sub-carrier of a sub-band having larger sub-carrier interval is configured with larger power; in addition, the configured power of each sub-band is in direct proportion to a bandwidth of the sub-band;

(2) when the BW of one of all the sub-bands is equal to $f_0-f_3$ or equal to $f_4-f_0$:

a) the sub-band with BW equal to $f_0-f_3$ is configured in the frequency domain range from the frequency point $f_3$ to the frequency point $f_0$, or the sub-band with BW equal to $f_4-f_0$ is configured in the frequency domain range from the frequency point $f_4$ to the frequency point $f_0$;

b) sub-bands on the other side of the outmost of the TBC are configured:

i. in a case where sub-bands having the same sub-carrier interval is configured with the smallest sub-carrier interval:

if some of these sub-bands have the same and smallest bandwidth, then any one of these sub-bands with the same bandwidth is configured on the other side of the outmost of the TBC;

if some of these sub-bands have the same bandwidth but not the smallest bandwidth, then one of the sub-bands with the smallest bandwidth is configured on the other side of the outmost of the TBC;

if none of the bandwidths of these sub-carriers are equal, then one of the sub-bands with the smallest bandwidth is configured on the other side of the outmost of the TBC;

if the bandwidths of all these sub-bands are equal, then any one of these sub-bands with the same bandwidth is configured on the other side of the outmost of the TBC.

ii. if sub-bands having the same sub-carrier interval do not have the smallest sub-carrier interval, then one of the sub-bands having the smallest sub-carrier interval is configured on the other side of the outmost of the TBC;

c) sub-bands at the rest positions of the TBC are configured: the remaining sub-bands are configured in the remaining frequency range of the TBC in an order in which the sub-carrier interval monotonically increases and in an order in which the bandwidth monotonically increases for different sub-bands having the same sub-carrier interval, such that the sub-carrier intervals of all different sub-bands monotonically increase and the bandwidths of different sub-bands having the same sub-carrier interval monotonically increase in the remaining frequency range from frequency point $f_3$ to frequency point $f_0$ or from frequency point $f_4$ to frequency point $f_0$;

d) power of all sub-bands is configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band.

In the above configuration steps, all the sub-bands may be continuous or discontinuous (i.e. there is a certain guard interval between adjacent sub-bands). After the configuration of all the sub-bands is completed by means of the above steps, if $f_3-f_1=f_2-f_4$, the guard bands on both sides of the TBC are symmetrical; otherwise, the guard bands are asymmetrical.

When the sub-band at the outmost of the TBC is configured, no specific requirement is made on the corresponding relationship between the configured two sub-bands and the outmost of the TBC.

It is assumed that there are 4 SBs ($SB_1 \sim SB_4$) having the same and smallest sub-carrier interval, i.e., $\Delta f_1 = f_2 = f_3 = \Delta f_4 \ldots < \Delta f_n$. Examples are as follows:

1) if some of these sub-bands have the same and smallest bandwidth, e.g., $BW_1=BW_2=BW_3<BW_4$, then any two of three sub-bands $SB_1$, $SB_2$, and $SB_3$ are configured immediately adjacent to the frequency point $f_3$ and the frequency point $f_4$;

2) if none of the bandwidths of these sub-carriers are equal, e.g., $BW_1<BW_2<BW_3<BW_4$, then the sub-band $SB_1$ is configured immediately adjacent to the frequency point $f_3$ and the sub-band $SB_2$ is configured immediately adjacent to the frequency point $f_4$; alternatively, the sub-band $SB_1$ is configured immediately adjacent to the frequency point $f_4$ and the sub-band $SB_2$ is configured immediately adjacent to the frequency point $f_3$;

3) if some of these sub-bands have the same bandwidth but not the smallest bandwidth, e.g., $BW_1<BW_2=BW_3<BW_4$, then the sub-band $SB_1$ is configured immediately adjacent to the frequency point $f_3$, and the sub-band $SB_2$ or the sub-band $SB_3$ is configured immediately adjacent to the frequency point $f_4$; alternatively, the sub-band $SB_1$ is configured immediately adjacent to the frequency point $f_4$, and the sub-band $SB_2$ or the sub-band $SB_3$ is configured immediately adjacent to the frequency point $f_3$;

4) if the bandwidths of all these sub-bands are equal, e.g., $BW_1=BW_2=BW_3=BW_4$, then any two of the four sub-bands are configured immediately adjacent to the frequency point $f_4$ and the frequency point $f_3$.

It is assumed that sub-bands having the same sub-carrier interval do not have the smallest sub-carrier interval, the sub-band having the smallest sub-carrier interval is configured on one side of the outmost of the TBC, and the sub-band having the second smallest sub-carrier interval is configured on the other side of the outmost of the TBC. That is, the sub-carrier intervals of the two sub-bands configured at the outermost of the TBC are different.

When the sub-band in the middle of the CB is configured, no specific requirement is made on the corresponding relationship between the configured two sub-bands and the middle position of the CB.

It is assumed that there are 4 SBs ($SB_{n-3} \sim SB_n$) having the same and the largest sub-carrier interval, i.e., $\Delta f_1 \ldots < \Delta f_{n-3} = \Delta f_{n-2} = \Delta f_{n-1} = \Delta f_n$. Examples are as follows:

1) if some of these sub-bands have the same and largest bandwidth, e.g., $BW_{n-3}<BW_{n-2}=BW_{n-1}=BW_n$, then any two of the three sub-bands, $SB_n$, $SB_{n-1}$ and $SB_{n-2}$ are configured on two sides of the frequency point $f_0$;

2) if the bandwidths of these sub-bands are not equal, e.g., $BW_{n-3}<BW_{n-2}<BW_{n-1}<BW_n$, then the sub-band $BW_n$ is configured on one side of two sides of the frequency point $f_0$, and the sub-band $BW_{n-1}$ is configured on the other side of two sides of the frequency point $f_0$;

3) if some of these sub-bands have the same bandwidth but not the largest bandwidth, e.g., $BW_{n-3}<BW_{n-2}=BW_{n-1}<BW_n$, then the sub-band $BW_n$ is configured on the left side of two sides of the frequency point $f_0$, the sub-band $BW_{n-1}$ or $BW_{n-2}$ is configured on the right side of the frequency point $f_0$, alternatively, the sub-band $BW_{n-1}$ or $BW_{n-2}$ is configured on the left side of two sides of the frequency point $f_0$, the sub-band $BW_n$ is configured on the right side of the frequency point $f_0$;

4) if the bandwidths of all these sub-bands are equal, e.g., $BW_{n-3}=BW_{n-2}=BW_{n-1}=BW_n$, then any two of the four sub-bands is configured on two sides of the frequency point $f_0$.

It is assumed that sub-bands having the same sub-carrier interval do not have the largest sub-carrier interval, the sub-band having the largest sub-barrier interval is configured on one side of two sides of the frequency point $f_0$, and the sub-band with the second largest sub-carrier interval is configured on the other side of two sides of the frequency point $f_0$. That is, the sub-carrier intervals of two sub-bands configured on two sides of the frequency point $f_0$ are different.

The sub-bands at the rest positions of the TBC are configured, and for the remaining sub-bands, no specific requirement is made on the sub-bands configured in the remaining frequency domain bandwidth of $f_0-f_3$ or $f_4-f_0$ either. That is, any one of these remaining sub-bands may be placed within the remaining frequency domain bandwidth of $f_0-f_3$ or $f_4-f_0$.

In an example, it is assumed that n (n>4) SBs are included in the TBC, and the sub-carrier intervals are $\Delta f_1$, $\Delta f_2$, $\Delta f_3$, $\Delta f_4$, \ldots, $\Delta f_i$, $\Delta f_{i+1}$, $\Delta f_{i+2}$, $\Delta f_{i+3}$, \ldots $\Delta f_{n-3}$, $\Delta f_{n-2}$, $\Delta f_{n-1}$, $\Delta f_n$ respectively. The relationship of these sub-carrier intervals is:

$$\Delta f_1 = \Delta f_2 = \Delta f_3 = \Delta f_4 < \ldots < \Delta f_i = \Delta f_{i+1} = \Delta f_{i+2} = \Delta f_{i+3} < \ldots < \Delta f_{n-3} = \Delta f_{n-2} = \Delta f_{n-1} = \Delta f_n.$$

All the n SBs are numbered according to the corresponding relation of the sub-carrier intervals, i.e., the sub-carrier interval corresponding to the $SB_i$ is $\Delta f_i$, where i=1, 2, \ldots n-1, n.

The bandwidths of the sub-bands are $BW_1$, $BW_2$, $BW_3$, $BW_4$, \ldots, $BW_i$, $BW_{i+1}$, $BW_{i+2}$, $BW_{i+3}$, \ldots $BW_{n-3}$, $BW_{n-2}$, $BW_{n-1}$, $BW_n$ respectively, and each of these bandwidths is less than $f_0-f_3$ and $f_4-f_0$. The relationship of the bandwidths of the sub-bands is:

$$BW_1 < BW_2 = BW_3 < BW_4 < \ldots < BW_i = BW_{i+1} < BW_{i+2} = BW_{i+3} < \ldots < BW_{n-3} < BW_{n-2} = BW_{n-1} < BW_n.$$

The power configured for the sub-bands are $P_1$, $P_2$, \ldots, $P_i$, $P_{i+1}$, \ldots $P_{n-1}$, $P_n$ respectively. The power configured for the sub-carriers in each sub-band is $p_1$, $p_2$, \ldots, $p_i$, $p_{i+1}$, \ldots $p_{n-1}$, $p_n$ respectively. Since the sub-carrier intervals are equal in each sub-band, the power of the sub-carriers in each sub-band is also equal.

Then the step method in this embodiment is performed as follows:

1. the two sub-bands at the outmost of the TBC are configured: the sub-band $SB_1$ is configured immediately adjacent to the frequency point $f_3$, and any one, e.g., $SB_2$, of the two sub-bands $SB_2$ and $SB_3$ is configured immediately adjacent to the frequency point $f_4$;

2. the two sub-bands in the middle of the CB are configured: the sub-band $SB_n$ is configured on the left side immediately adjacent to the frequency point $f_0$, any one, e.g., $SB_{n-1}$, of these two sub-bands $SB_{n-2}$ and $SB_{n-1}$ is configured on the right side immediately adjacent to the frequency point $f_0$;

3. the sub-bands at the rest positions of the TBC are configured: and (x–2) sub-bands are finally configured in the remaining frequency range from the frequency point $f_3$ to the frequency point $f_0$ in an order in which the sub-carrier interval monotonically increases and in an order in which the bandwidth monotonically increases for different sub-bands having the same sub-carrier interval, and (n−x−2) sub-bands are finally configured in the remaining frequency range from the frequency point $f_4$ to the frequency point $f_0$ in an order in which the bandwidth monotonically increases for different sub-bands with the same sub-carrier interval.

Figure 11:
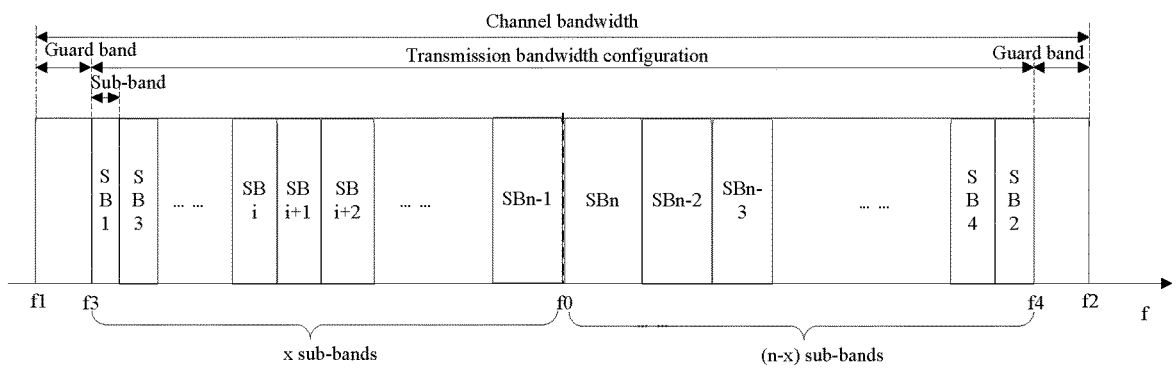
FIG. 11 is a schematic diagram VIII of a sub-band configuration within a channel bandwidth according to an embodiment of the present disclosure.

All the sub-bands are configured by means of the three steps described above, as shown in FIG. 11. In the frequency range from the frequency point $f_3$ to the frequency point $f_0$ and the frequency range from the frequency point $f_4$ to the frequency point $f_0$, among all the configured sub-bands, the sub-carrier intervals of different sub-bands monotonically increase, and the bandwidths of different sub-bands with the same sub-carrier interval monotonically increase. That is, the sub-carrier intervals and the bandwidths in the frequency range from the frequency point $f_3$ to the frequency point $f_0$ satisfy:

$$\Delta f_1 = \Delta f_3 \ldots < \Delta f_i = \Delta f_{i+1} = \Delta f_{i+2} < \ldots < \Delta f_{n-1};$$

$$BW_1 < BW_3 < \ldots < BW_i = BW_{i+1} < BW_{i+2} < BW_{n-1}.$$

The sub-carrier intervals and the bandwidths in the frequency range from the frequency point $f_4$ to the frequency point $f_0$ satisfy: $\Delta f_2 = \Delta f_4 \ldots < \Delta f_{n-3} = \Delta f_{n-2} = \Delta f_n$; $BW_2 < BW_4 < \ldots < BW_{n-3} < BW_{n-2} < BW_n$ respectively.

In addition, in the frequency range from the frequency point $f_3$ to the frequency point $f_0$ and the frequency range from the frequency point $f_4$ to the frequency point $f_0$, all the configured sub-bands may be placed continuously or discontinuously (that is, there is a certain guard interval between adjacent sub-bands). After all the sub-bands are configured, if $f_3 - f_1 = f_2 - f_4$, the guard bands on both sides of the TBC are symmetrical; otherwise, the guard bands are asymmetrical.

After all the sub-bands are configured in the TBC, the power of the sub-carrier and the power of the sub-bands are configured. That is, the power in the frequency range from the frequency point $f_3$ to the frequency point $f_0$ satisfies: $p_1 = p_3 \ldots < p_i = p_{i+1} = p_{i+2} < \ldots < p_{n-1}$, and the power in the frequency range from the frequency point $f_4$ to the frequency point $f_0$ satisfies: $p_2 = p_4 \ldots < p_{n-3} = p_{n-2} = p_n$. The power of the sub-carriers in all sub-bands satisfies: $p_1 = p_2 = p_3 = p_4 < \ldots < p_i = p_{i+1} = p_{i+2} = p_{i+3} < \ldots < p_{n-3} = p_{n-2} = p_{n-1} = p_n$. The power $P_n$ configured for each sub-band is proportional to $BW_n$ of the sub-band.

Eighth Embodiment

In the present embodiment, a supplementary description will be given for the case of n<=4 in the sixth embodiment and the seventh embodiment described above.

In this embodiment, it is assumed that n sub-bands are included in the TBC, and the sub-carrier intervals in at least two of all the sub-bands are the same, and the sub-carrier intervals of different sub-bands are not all equal.

(1) If n=2, when the radio resource is configured in the CB, the following steps are performed:

(1.1) these two sub-bands are configured in frequency domain ranges from frequency point $f_3$ to frequency point $f_0$ and from frequency point $f_4$ to frequency point $f_0$, respectively;

(1.2) power of the sub-bands is configured, such that all sub-carriers in each sub-band are configured with equal power. In addition, the configured power of each sub-band is in direct proportion to a bandwidth of the sub-band.

(2) If n=3 or 4, when the radio resource is configured in the CB, the following steps are performed:

(2.1) when the BW of each sub-bands is less than $f_0 - f_3$ and less than $f_4 - f_0$:

a) two sub-bands at the outmost of the TBC are configured:

i. in a case where sub-bands having the same sub-carrier interval have the smallest sub-carrier interval:

if some of these sub-bands having the same and smallest bandwidth, then any two of these sub-bands with the same bandwidth are configured on both sides of the outmost of the TBC;

if some of these sub-bands have the same bandwidth but not the smallest bandwidth, then one of the sub-bands with the smallest bandwidth is configured on one side of the outmost of the TBC, and any one of the sub-bands with the same bandwidth is configured on the other side of the outmost of the TBC;

if none of the bandwidths of these sub-carriers are equal, then one of the sub-bands with the smallest bandwidth is configured on one side of the outmost of the TBC, and one of the sub-bands with the second smallest bandwidth is configured on the other side of the outmost of the TBC;

if the bandwidths of all these sub-bands are equal, then any two of these sub-bands with equal bandwidth are configured on both sides of the outmost of the TBC;

ii. if sub-bands having the same sub-carrier interval do not have the smallest sub-carrier interval, then a sub-band having the smallest sub-carrier interval is configured on one side of the outmost of the TBC, and a sub-band having the second smallest sub-carrier interval is configured on the other side of the outmost of the TBC;

b) sub-bands at the rest positions of the TBC are configured: the remaining sub-bands are configured in a frequency range of the remaining TBC;

c) power of all sub-band are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band;

(3) when the BW of one of all the sub-bands is equal to $f_0 - f_3$ or equal to $f_4 - f_0$:

a) the sub-band with BW equal to $f_0 - f_3$ is configured in the frequency domain range from the frequency point $f_3$ to the frequency point $f_0$, or the sub-band with BW equal to $f_4 - f_0$ is configured in the frequency domain range from the frequency point $f_4$ to the frequency point $f_0$;

b) sub-bands on the other side of the outmost of the TBC are configured:

i. in a case where sub-bands having the same sub-carrier interval have the smallest sub-carrier interval:

if some of these sub-bands have the same and smallest bandwidth, then any one of these sub-bands with the same bandwidth is configured on the other side of the outmost of the TBC;

if some of these sub-bands have the same bandwidth but not the smallest bandwidth, then one of the sub-bands with the smallest bandwidth is configured on the other side of the outmost of the TBC;

if none of the bandwidths of these sub-carriers are equal, then one of the sub-bands with the smallest bandwidth is configured on the other side of the outmost of the TBC;

if the bandwidths of all these sub-bands are equal, then any one of these sub-bands with the same bandwidth is configured on the other side of the outmost of the TBC;

ii. if sub-bands having the same sub-carrier interval do not have the smallest sub-carrier interval, then one of the sub-bands having the smallest sub-carrier interval is configured on the other side of the outmost of the TBC;

c) sub-bands at the rest positions of the TBC are configured: the remaining sub-bands are configured in the remaining frequency range of the TBC in an order in which the sub-carrier interval monotonically increases and in an order in which the bandwidth monotonically increases for different sub-bands having the same sub-carrier interval, such that the sub-carrier intervals of all different sub-bands monotonically increase and the bandwidths of different sub-bands having the same sub-carrier interval monotonically increase in the remaining frequency range from frequency point $f_3$ to frequency point $f_0$ or from frequency point $f_4$ to frequency point $f_0$;

d) power of the sub-bands are configured, such that each sub-carrier of a sub-band having a smaller sub-carrier interval is configured with smaller power, or each sub-carrier of a sub-band having a larger sub-carrier interval is configured with larger power; in addition, the configured power of each sub-band is in direct proportion to a bandwidth of the sub-band.

In summary, the present disclosure provides a technical solution for configuring different radio resources and power of the radio resources at different sub-carrier intervals in consideration of different out-of-band leakage caused by configuration of different radio resources and different power, such that the out-of-band leakage outside the channel band of the carrier is as small as possible, which may not only satisfy the requirement for the out-of-band leakage, but also improve the spectrum resource utilization rate, improve the system performance, and reduce the requirements of the system on devices.

According to another embodiment of the present disclosure, there is also provided a storage medium (the storage medium may be a ROM, a RAM, a hard disk, a removable memory, etc.), in which a computer program for performing radio resource configuration is embedded. The computer program has a code segment configured to perform the following steps: sub-bands are configured within a channel bandwidth; and any one of multiple sub-bands having a smallest sub-carrier interval is configured at an outmost position of a transmission bandwidth configuration.

An embodiment of the present disclosure further provides a storage medium (the storage medium may be a ROM, a RAM, a hard disk, a removable memory, or the like), in which a computer program for performing power allocation is embedded. The computer program has a code segment configured to perform the following steps: power of each and every sub-band is configured within a channel bandwidth, where each sub-carrier of a sub-band having a smaller sub-carrier interval is configured with smaller power, and each sub-carrier of a sub-band having a larger sub-carrier interval is configured with larger power.

An embodiment of the present disclosure further provides a computer program. The computer program has a code segment configured to perform the following radio resource configuration steps: sub-bands are configured within a channel bandwidth; and any one of multiple sub-bands having a smallest sub-carrier interval is configured at an outmost position of a transmission bandwidth configuration.

An embodiment of the present disclosure also provide a computer program. The computer program had s code segment configured to perform the following power allocation steps: power of each and every sub-bands is allocated within a channel bandwidth, where each sub-carrier of a sub-band having a smaller sub-carrier interval is configured with smaller power, and each sub-carrier of a sub-band having a larger sub-carrier interval is configured with larger power.

Figure 12:
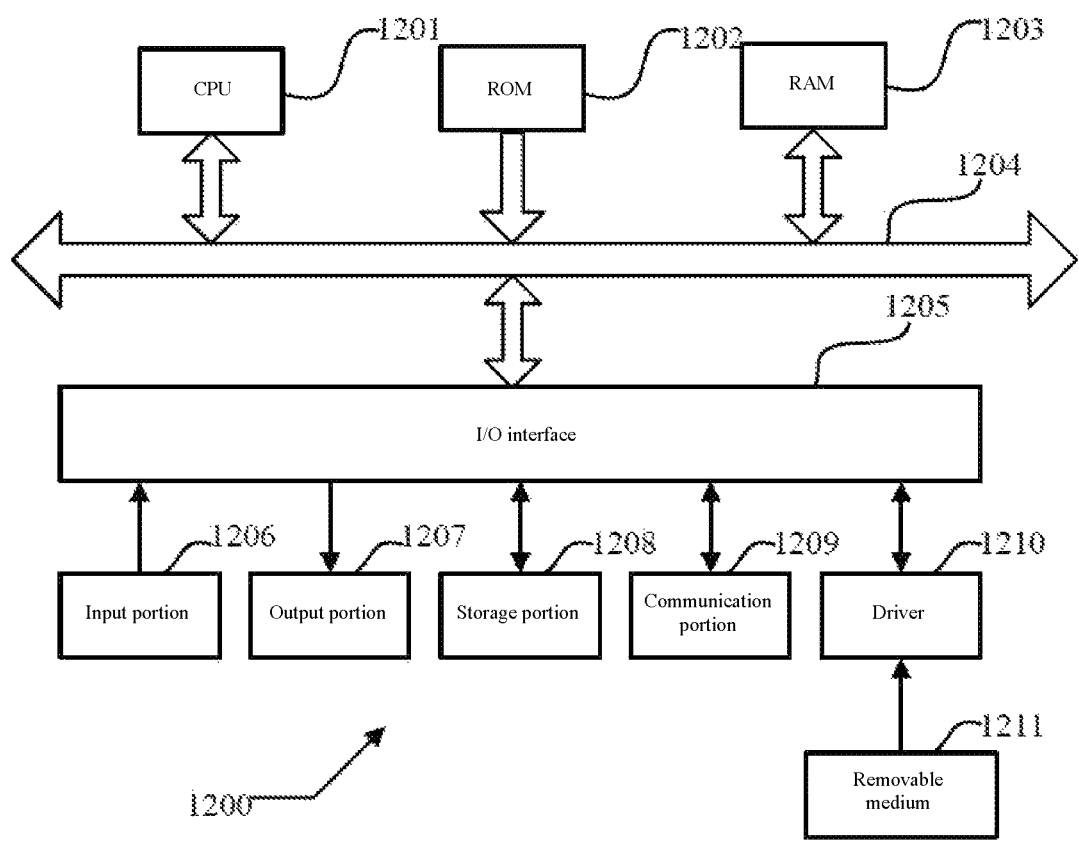
FIG. 12 is a block diagram of a computer implementing the technical solution of the present disclosure.

In a case where the present disclosure is implemented by software and/or firmware, a program constituting the software is installed from a storage medium or a network to a computer having a dedicated hardware structure, such as a general-purpose computer 1200 shown in FIG. 12. This computer is capable of executing various functions and so on when various programs are installed.

In FIG. 12, a central processing unit (CPU) 1201 executes various processing in accordance with a program stored in a read-only memory (ROM) 1202 or a program loaded from a storage portion 1208 into a random-access memory (RAM) 1203. In the RAM 1203, data required when the CPU 1201 executes various processing and the like is also stored as necessary. The CPU 1201, the ROM 1202, and the RAM 1203 are connected to each other via a bus 1204. An input/output interface 1205 is also connected to the bus 1204.

The following components are connected to the input/output interface 1205: an input portion 1206 including a keyboard, a mouse, and so on; an output portion 1207 including a display such as a cathode ray tube (CRT), a liquid crystal display (LCD), and so on, and including a speaker and so on; a storage portion 1208 including a hard disk and so on; and a communication portion 1209 including a network interface card such as a LAN card, a modem, and so on. The communication portion 1209 performs communication processing via a network such as the internet.

A driver 1210 is also connected to the input/output interface 1205 as necessary. A removable medium 1211 such as a magnetic disk, an optical disk, a magneto-optical disk, a semiconductor memory and so on is mounted on the driver 1210 as necessary, such that a computer program read out therefrom is installed into the storage portion 1208 as necessary.

In a case where the above-described series of processes is realized by the software, a program constituting the software is installed from a network such as the internet or a storage medium such as the removable medium 1211.

It should be understood by those skilled in the art that such a storage medium is not limited to the removable medium 1211 shown in FIG. 12 in which the program is stored, distributed separately from an apparatus to provide the program to the user. Examples of the removable medium 1211 include a magnetic disk (including a floppy disk (registered trademark)), an optical disk (including a compact disc-read only memory (CD-ROM) and a digital versatile disc, DVD), a magneto-optical disk (including a mini-disk (MD) (registered trademark)), and a semiconductor memory. Alternatively, the storage medium may be the ROM 1202, the hard disk included in the storage portion 1208 and so on, in which programs are stored and which are distributed to users together with the apparatus including them.

It is further noted that in the apparatus and method of the present disclosure, it is apparent that each component or step may be decomposed and/or recombined. These decompositions and/or re-combinations are to be regarded as equivalents of the present disclosure. Also, the steps of executing the series of processes described above may naturally be executed chronologically in the order described, but need not necessarily be executed chronologically. Some steps may be performed in parallel or independently of each other.

Although the present disclosure and its advantages have been described in detail, it should be understood that various changes, substitutions and alterations may be made herein without departing from the spirit and scope of the present disclosure as defined by the appended claims. Furthermore, the terms "includes" "including" or any other variation thereof in the present application are intended to cover a non-exclusive inclusion, such that a process, method, article, or apparatus that includes a list of elements include not only those elements but include other elements not expressly listed or inherent to such process, method, article, or apparatus. Without further limitation, an element defined by the phrase "including an . . . " does not exclude the presence of other identical elements in a process, method, article, or apparatus that includes the element.

The technical means and effects of the present disclosure adopted to achieve the predetermined purpose should be more deeply and specifically understood by way of the explanation of the specific embodiment. However, the accompanying drawings are only for the purpose of reference and illustration, and are not intended to limit the present disclosure.

INDUSTRIAL APPLICABILITY

In the present disclosure, sub-bands are configured within the channel bandwidth, and any one of multiple sub-bands having the smallest sub-carrier interval is configured at the outmost position of the transmission bandwidth configuration. When the sub-bands within the channel bandwidth of the transmitting node carrier are configured, the sub-carrier interval of the sub-band configured at the outmost of the transmission bandwidth configuration is the smallest. Since the sub-band having the smaller the sub-carrier interval corresponds to faster out-of-band attenuation in the frequency domain, it is possible to reduce the out-of-band leakage outside the channel band of the entire carrier, avoid configuration of the larger guard band, increase the spectrum resource utilization rate significantly, reduce the requirement on the radio frequency device, and reduce the cost. The power of each and every sub-band within the channel bandwidth of the transmitting node carrier is configured, such that each sub-carrier in the sub-band having the smaller sub-carrier interval is configured with smaller power, and each sub-carrier in the sub-band having the larger sub-carrier interval is configured with larger power. Since a smaller sub-carrier interval means larger length of the sub-carrier in time domain and more time for accumulating power in the time domain, smaller power is allocated in the power configuration; and since a larger sub-carrier interval means less length of the sub-carrier in the time domain and less time for accumulating power in the time domain, larger power is allocated in the power configuration. As such, on one hand, the power on each resource element (RE) may be ensured to be unchanged; and on the other hand, the out-of-band leakage may be reduced.

What is claimed is:

1. A radio resource configuration method, comprising: configuring a plurality of sub-bands within a channel bandwidth, and configuring any one of at least one sub-band having a smallest sub-carrier interval at an outmost position of a transmission bandwidth configuration, performing data transmission according to the transmission bandwidth configuration.

2. The configuration method of claim 1, wherein among the sub-bands configured within the channel bandwidth, a sub-band closest to a middle position of the channel bandwidth has a largest sub-carrier interval.

3. The configuration method of claim 1, wherein in a frequency domain range from the outmost position of the transmission bandwidth configuration to a middle position of the channel bandwidth, sub-carrier intervals within configured different sub-bands monotonically increase.

4. The configuration method of claim 3, wherein among all the sub-bands configured in the frequency domain range from the outmost position of the transmission bandwidth configuration to the middle position of the channel bandwidth, bandwidths of different sub-bands having a same sub-carrier interval monotonically increase.

5. The configuration method of claim 1, wherein the sub-band is a section of continuous physical time-frequency resource block having a same sub-carrier interval.

6. The configuration method of claim 1, wherein the channel bandwidth is a radio frequency bandwidth of a transmitting node carrier in a system;
the transmission bandwidth configuration is a total bandwidth in a frequency domain of physical time-frequency resources within the channel bandwidth;
two guard bands disposed within the channel bandwidth and outside the transmission bandwidth configuration are symmetric or asymmetrical.

7. The configuration method of claim 1, further comprising:
configuring power of the sub-bands within the channel bandwidth, wherein each sub-carrier of a sub-band having a smaller sub-carrier interval is configured with smaller power, and each sub-carrier of a sub-band having a larger sub-carrier interval is configured with larger power.

8. The configuration method of claim 7, wherein the power of each sub-band is proportional to a bandwidth of the each sub-band within the channel bandwidth.

9. A node, comprising:
a processor; and
a memory for storing instructions executable by the processor,
wherein the processor is configured to:
configure a plurality of sub-bands within a channel bandwidth, and configure any one of at least one sub-band having a smallest sub-carrier interval at an outmost position of a transmission bandwidth configuration, performing data transmission according to the transmission bandwidth configuration.

10. The node of claim 9, wherein among the sub-bands configured within the channel bandwidth, a sub-band closest to a middle position of the channel bandwidth has a largest sub-carrier interval.

11. The node of claim 9 wherein in a frequency domain range from the outmost position of the transmission bandwidth configuration to a middle position of the channel bandwidth, sub-carrier intervals within the configured different sub-bands monotonically increase.

12. The node of claim 11, wherein among all the sub-bands configured in the frequency domain range from the outmost position of the transmission bandwidth configuration to the middle position of the channel bandwidth, bandwidths of different sub-bands having a same sub-carrier interval monotonically increase.

13. The node of claim 9, wherein the processor is further configured to configure power of the sub-bands within the channel bandwidth,
wherein each sub-carrier of a sub-band having a smaller sub-carrier interval is configured with smaller power, and each sub-carrier of a sub-band having a larger sub-carrier interval is configured with larger power.

14. The node of claim 13, wherein the processor is further configured to configure the power of the sub-bands within the channel bandwidth in a manner where the power of each sub-band is proportional to a bandwidth of the each sub-band within the channel bandwidth.

15. A non-transitory storage medium, comprising a stored program, wherein the program is executed to perform the radio resource configuration method of claim 1.

* * * * *